(12) United States Patent
Tour et al.

(10) Patent No.: US 10,086,334 B2
(45) Date of Patent: *Oct. 2, 2018

(54) BANDGAP ENGINEERING OF CARBON QUANTUM DOTS

(71) Applicant: William Marsh Rice University, Houston, TX (US)

(72) Inventors: James M. Tour, Bellaire, TX (US); Ruquan Ye, Houston, TX (US); Andrew Metzger, Houston, TX (US); Macy Stavinoha, Weimar, TX (US); Yonghao Zheng, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/320,201

(22) PCT Filed: Jun. 19, 2015

(86) PCT No.: PCT/US2015/036729
§ 371 (c)(1),
(2) Date: Dec. 19, 2016

(87) PCT Pub. No.: WO2016/053411
PCT Pub. Date: Apr. 7, 2016

(65) Prior Publication Data
US 2017/0152145 A1  Jun. 1, 2017

Related U.S. Application Data

(60) Provisional application No. 62/014,627, filed on Jun. 19, 2014.

(51) Int. Cl.
*C01B 32/182* (2017.01)
*B01D 61/14* (2006.01)
(Continued)

(52) U.S. Cl.
CPC ............ *B01D 61/145* (2013.01); *C01B 32/05* (2017.08); *C01B 32/182* (2017.08); *C09K 11/65* (2013.01);
(Continued)

(58) Field of Classification Search
CPC ............ C01B 31/0293; C01B 31/0446; C01B 2204/32; C01B 32/05; C01B 32/182;
(Continued)

(56) References Cited

U.S. PATENT DOCUMENTS

2004/0223901 A1* 11/2004 Smalley ............... B01J 3/04
423/447.3
2006/0121279 A1   6/2006 Petrik
(Continued)

FOREIGN PATENT DOCUMENTS

CN    101973541 A       2/2011
CN    102849724 A  *    1/2013
(Continued)

OTHER PUBLICATIONS

Ye, Ruquan, et al. "Coal as an abundant source of graphene quantum dots." Nature communications 4 (2013).*
(Continued)

*Primary Examiner* — Richard M Rump
(74) *Attorney, Agent, or Firm* — Winstead PC

(57) ABSTRACT

Embodiments of the present disclosure pertain to scalable methods of producing carbon quantum dots with desired bandgaps by the following steps: exposing a carbon source to an oxidant at a reaction temperature, where the exposing results in the formation of the carbon quantum dots; and selecting a desired size of the formed carbon quantum dots. In some embodiments, the selecting occurs by at least one of separating the desired size of the formed carbon quantum dots from other formed carbon quantum dots; selecting the
(Continued)

reaction temperature that produces the desired size of the formed carbon quantum dots; and combinations of such steps. The desired size of carbon quantum dots can include a size range. The methods of the present disclosure can also include a step of purifying the formed carbon quantum dots prior to selecting a desired size.

54 Claims, 19 Drawing Sheets

(51) Int. Cl.
    *C09K 11/65*     (2006.01)
    *C01B 32/05*     (2017.01)
(52) U.S. Cl.
    CPC ...... *B01D 2315/10* (2013.01); *C01B 2204/32* (2013.01); *C01P 2004/62* (2013.01); *C01P 2004/64* (2013.01)
(58) Field of Classification Search
    CPC .. C09K 11/65; B01D 61/145; B01D 2315/10; C01P 2004/64; C01P 2004/62
    See application file for complete search history.

(56) References Cited

U.S. PATENT DOCUMENTS

| | | |
|---|---|---|
| 2011/0186789 A1 | 8/2011 | Samulski et al. |
| 2011/0217721 A1 | 9/2011 | Allam et al. |
| 2012/0201738 A1 | 8/2012 | Kwon et al. |
| 2015/0280248 A1 | 10/2015 | Tour et al. |
| 2016/0060122 A1 | 3/2016 | Tour et al. |
| 2017/0096600 A1 | 4/2017 | Tour et al. |

FOREIGN PATENT DOCUMENTS

| | | |
|---|---|---|
| CN | 102849724 A | 1/2013 |
| CN | 102336404 B | 4/2013 |
| WO | WO-2014179708 A1 | 11/2014 |
| WO | WO-2016/025051 A2 | 2/2016 |
| WO | WO-2016-118214 A2 | 7/2016 |

OTHER PUBLICATIONS

Li, Haitao, et al. "Water—soluble fluorescent carbon quantum dots and photocatalyst design." Angewandte Chemie 122.26 (2010): 4532-4536.*
Pan, Dengyu, et al. "Hydrothermal route for cutting graphene sheets into blue-luminescent graphene quantum dots." Advanced materials 22.6 (2010): 734-738.*
Liu, Yong, and Peiyi Wu. "Graphene quantum dot hybrids as efficient metal-free electrocatalyst for the oxygen reduction reaction." ACS applied materials & interfaces 5.8 (2013): 3362-3369.*
Office Action for U.S. Appl. No. 14/888,301, dated Sep. 19, 2016.
Wu, Yingpeng, et al., "Efficient and large scale synthesis of graphene from coal and its film electrical property studies," Journal of Nanoscience and Nanotechnology, 13.2 (2013): 929-932.
Pan, Dengyu et al., "Hydrothermal route for cutting graphene sheets into blue-luminescent graphene quantum dots", Advanced Materials 22.6 (2010): 734-738.
Office Action for U.S. Appl. No. 14/669,849, dated Dec. 8, 2017.
Shi, et al.; Graphene-Quantum-Dot Assembled Nanotubes: A New Platform for Efficient Raman Enhancement; vol. 6, No. 3, pp. 2237-2244; 2012.
Rao, et al; Synthesis, Structure and Properties fo Boron-and Nitrogen-Doped Graphene; Adv. Mater.; 21, 4726-4730; 2009.
Extended European Search Report for EP15847060.9, dated Nov. 2, 2017.
Lingling Li et al: "Focusing on luminescent graphene quantum dots: current status and future perspectives", Nanoscale, val. 5, No. 10, Jan. 10, 2013 (Jan. 10, 2013), p. 4015.
International Preliminary Report on Patentability for PCT/US2015/036729, dated Dec. 29, 2016.
International Search Report and Written Opinion for PCT/US2015/036729, dated Mar. 11, 2016.
Kostarelos, K. Nat Biotechnol 2008, 26, 774.Marcano, D. C. et al. Improved synthesis of graphene oxide. ACS Nano 4, 4806-4814 (2010).
Krupke, R.; Hennrich, F.; von Lohneysen, H.; Kappes, M. M., Separation of metallic from semiconducting single-walled carbon nanotubes, Science 2003, 301, 344.
Ghosh, S.; Bachilo, S. M.; Weisman, R. B., Advanced sorting of single-walled carbon nanotubes by nonlinear density-gradient ultracentrifugation, Nat Nanotechnol 2010, 5, 443.
Zheng, M.; Jagota, A.; Semke, E. D.; Diner, B. A.; Mclean, R. S.; Lustig, S. R.; Richardson, R. E.; Tassi, N. G., DNA-assisted Dispersion and Separation of Carbon Nanotubes, Nature materials 2003, 2, 338.
Zhu, S. J.; Zhang, J. H.; Liu, X.; Li, B.; Wang, X. F.; Tang, S. J.; Meng, Q. N.; Li, Y. F.; Shi, C.; Hu, R.; Yang, B. Graphene Quantum Dots with Controllable Surface Oxidation, Tunable Fluorescence and Up-Conversion Emission. RSC Adv. 2012, 2, 2717.
Kwon, W.; Kim, Y. H.; Lee, C. L.; Lee, M.; Choi, H. C.; Lee, T. W.; Rhee, S. W. Electroluminescence from Graphene Quantum Dots Prepared by Amidative Cutting of Tattered Graphite. Nano Lett. 2014, 14, 1306.
Tang, L.; Ji, R.; Li, X.; Bai, G.; Liu, C.; Hao, J.; Lin, J.; Jiang, H.; Teng, K. S.; Yang, Z.; Lau, S. P. Deep Ultraviolet to Near-Infrared Emission and Photoresponse in Layered N-Doped Graphene Quantum Dots. ACS Nano 2014, 8, 6312-6320.
Tetsuka, H.; Asahi, R.; Nagoya, A.; Okamoto, K.; Tajima, I.; Ohta, R.; Okamoto, A., Optically Tunable Amino-Functionalized Graphene Quantum Dots, Advanced materials 2012, 24, 5333.
Zhu, S. J.; Zhang, J. H.; Tang, S. J.; Qiao, C. Y.; Wang, L.; Wang, H. Y.; Liu, X.; Li, B.; Li, Y. F.; Yu, W. L.; Wang, X. F.; Sun, H. C.; Yang, B., Surface Chemistry Routes to Modulate the Photoluminescence of Graphene Quantum Dots: From Fluorescence Mechanism to Up-Conversion Bioimaging Applications, Advanced Functional Materials 2012, 22, 4732.
Alivisatos, A. P. Semiconductor Clusters, Nanocrystals, and Quantum Dots. Science 1996, 271, 933.
Alvarez, R.; Clemente, C.; Gomez-Limon, D., The influence of nitric acid oxidation of low rank coal and its impact on coal structure, Fuel 2003, 82, 2007-2015.
Ajayaghosh, A., Donor-acceptor type low band gap polymers: polysquaraines and related systems, Chem Soc Rev 2003, 32, 181.
Roncali, J. Molecular Engineering of the Band Gap of ?-Conjugated Systems: Facing Technological Applications, Macromol Rapid Comm 2007, 28, 1761.
Zhang, M.; Bai, L. L.; Shang, W. H.; Xie, W. J.; Ma, H.; Fu, Y. Y.; Fang, D. C.; Sun, H.; Fan, L. Z.; Han, M.; Liu, C. M.; Yang, S. H. Facile Synthesis of Water-Soluble, Highly Fluorescent Graphene Quantum Dots as a Robust Biological Label for Stem Cells. J. Mater. Chem. 2012, 22, 7461.
Zhu, S. et al., Strongly green-photoluminescent graphene quantum dots for bioimaging applications, Chem. Comm. 2011, 47, 6858-6860.
Guo, C. X. et al., Layered Graphene/Quantum Dots for Photovoltaic Devices, Angew. Che. Int. Ed. 2010, 49, 3014-3017 (2010).
Cao, A. et al., A Facile One-step Method to Produce Graphene-CdS Quantum Dot Nanocomposites as Promising Optoelectronic Materials, Adv. Mater. 2010, 22, 103-106.
Kongkanand, A.; Tvrdy, K.; Takechi, K.; Kuno, M.; Kamat, P. V. Quantum Dot Solar Cells. Tuning Photoresponse through Size and Shape Control of CdSe?TiO2 Architecture. J. Am. Chem. Soc. 2008, 130, 4007.
Zhao, Q. D.; Xie, T. F.; Peng, L. L.; Lin, Y. H.; Wang, P.; Peng, L.; Wang, D. J. Size- and Orientation-Dependent Photovoltaic Properties of ZnO Nanorods. J Phys. Chem. C 2007, 111, 17136.
Klostranec, J. M.; Chan, W. C. W. Quantum Dots in Biological and Biomedical Research: Recent Progress and Present Challenges. Adv. Mater. 2006, 18, 1953.

(56) References Cited

OTHER PUBLICATIONS

Zhao, X.; Wang, S. J.; Zhang, W. J.; Qiu, J. C.; Wu, Y. Z.; Liu, H. Z.; Xu, C. W.; Hao, X. P. Highly Biocompatible POSS-coated CdTe Quantum Dots for Cell Labeling. RSC Adv. 2014, 4, 598.

Kim, J. H.; Holloway, P. H. Near-Infrared-Electroluminescent Light-Emitting Planar Optical Sources Based on Gallium Nitride Doped with Rare Earths. Adv. Mater. 2005, 17, 91-96.

Zhang, K. H. L.; Bourlange, A.; Egdell, R. G.; Collins, S. P.; Bean, R. J.; Robinson, I. K.; Cowley, R. A. Size-Dependent Shape and Tilt Transitions in In2O3 Nanoislands Grown on Cubic Y-Stabilized ZrO2(001) by Molecular Beam Epitaxy. ACS Nano 2012, 6, 6717.

Daniel, M. C.; Astruc, D. Gold Nanoparticles: Assembly, Supramolecular Chemistry, Quantum-Size-Related Properties, and Applications toward Biology, Catalysis, and Nanotechnology. Chem. Rev. 2004, 104, 293.

Smith, A. M.; Mohs, A. M.; Nie, S. Tuning the Optical and Electronic Properties of Colloidal Nanocrystals by Lattice Strain. Nat. Nanotech. 2009, 4, 56-63.

Park, N. M.; Kim, T. S.; Park, S. J. Band Gap Engineering of Amorphous Silicon Quantum Dots for Light-Emitting Diodes. Appl. Phys. Lett. 2001, 78, 2575.

Conley, H. J.; Wang, B.; Ziegler, J. I.; Haglund, R. F.; Pantelides, S. T.; Bolotin, K. I. Bandgap Engineering of Strained Monolayer and Bilayer MoS2. Nano Lett. 2013, 13, 3626.

Brunetti, V.; Chibli, H.; Fiammengo, R.; Galeone, A.; Malvindi, M. A.; Vecchio, G.; Cingolani, R.; Nadeau, J. L.; Pampa, P. P. InP/ZnS as a Safer Alternative to CdSe/ZnS Core/Shell Quantum Dots: in vitro and in vivo Toxicity Assessment Nanoscale. 2013, 5, 307.

Soenen, S. J.; Rivera-Gil, P.; Montenegro, J. M.; Parak, W. J.; De Smedt, S. C.; Braeckmans, K. Cellular Toxicity of Inorganic Nanoparticles: Common Aspects and Guidelines for Improved Nanotoxicity Evaluation. Nano Today 2011, 6, 446.

Liu, Q.; Guo, B. D.; Rao, Z. Y.; Zhang, B. H.; Gong, J. R. Strong Two-Photon-Induced Fluorescence from Photostable, Biocompatible Nitrogen-Doped Graphene Quantum Dots for Cellular and Deep-Tissue Imaging. Nano Lett. 2013, 13, 2436.

Luk, C. M.; Tang, L. B.; Zhang, W. F.; Yu, S. F.; Teng, K. S.; Lau, S. P. An Efficient and Stable Fluorescent Graphene Quantum Dot-Agar Composite as a Converting Material in White Light Emitting Diodes. J. Mater. Chem. 2012, 22, 22378.

Hu, C. F.; Liu, Y. L.; Yang, Y. H.; Cui, J. H.; Huang, Z. R.; Wang, Y. L.; Yang, L. F.; Wang, H. B.; Xiao, Y.; Rong, J. H. One-Step Preparation of Nitrogen-Doped Graphene Quantum Dots from Oxidized Debris of Graphene Oxide. J. Mater. Chem. B 2013, 1, 39.

Chong, Y.; Ma, Y.; Shen, H.; Tu, X.; Zhou, X.; Xu, J.; Dai, J.; Fan, S.; Zhang, Z. The in Vitro and in Vivo Toxicity of Graphene Quantum Dots. Biomaterials 2014, 35 5041.

Nurunnabi, M.; Khatun, Z.; Huh, K. M.; Park, S. Y.; Lee, D. Y.; Cho, K. J.; Lee, Y. In Vivo Biodistribution and Toxicology of Carboxylated Graphene Quantum Dots. ACS Nano 2013, 7, 6858.

Shen, J.; Zhu, Y.; Yang, X.; Li, C. Graphene Quantum Dots: Emergent Nanolights for Bioimaging, Sensors, Catalysis and Photovoltaic Devices. Chem. Commun. 2012, 48, 3686-3699.

Sun, H.; Gao, N.; Wu, L.; Ren, J.; Wei, W.; Qu, X. Highly Photoluminescent Amino-Functionalized Graphene Quantum Dots Used for Sensing Copper Ions. Chem. Eur. J. 2013, 19, 13362-13368.

Kumar, G. S.; Roy, R.; Sen, D.; Ghorai, U. K.; Thapa, R.; Mazumder, N.; Saha, S.; Chattopadhyay, K. K. Amino-Functionalized Graphene Quantum Dots: Origin of Tunable Heterogeneous Photoluminescence. Nanoscale 2014, 6, 3384-3391.

Kim, S.; Hwang, S. W.; Kim, M.; Shin, D. Y.; Shin, D. H.; Kim, C. O.; Yang, S. B.; Park, J. H.; Hwang, E.; Choi, S.; Ko, G.; Sim, S.; Sone, C.; Choi, H. J.; Bae, S.; Hong, B. H. Anomalous Behaviors of Visible Luminescence from Graphene Quantum Dots: Interplay between Size and Shape. ACS Nano 2012, 6, 8203.

Zhang, Z.; Zhang, J.; Chen, N.; Qu, L. Graphene Quantum Dots: an Emerging Material for Energy-Related Applications and Beyond. Energy Environ. Sci., 2012,5, 8869-8890.

Lingam, K.; Podila, R.; Qian, H.; Serkiz, S.; Rao, A. M. Evidence for Edge-State Photoluminescence in Graphene Quantum Dots. Adv. Funct. Mater. 2013, 23, 5062-5065.

Zhou, X.; Zhang, Y.; Wang, C.; Wu, X.; Yang, Y.; Zheng, B.; Wu, H.; Guo, S.; Zhang, J. Photo-Fenton Reaction of Graphene Oxide: A New Strategy to Prepare Graphene Quantum Dots for DNA Cleavage. ACS Nano 2012, 6, 6592-6599.

Nurunnabi, M.; Khatun, Z.; Huh, K. M.; Park, S. Y.; Lee, D. Y.; Cho, K. J.; Lee, Y. In Vivo Biodistribution and Toxicology of Carboxylated Graphene Quantum Dots. ACS Nano 2013, 7, 6858-6867.

Fei, H.; Ye, R.; Ye, G.; Gong, Y.; Peng, Z.; Fan, X.; Samuel, E. L.; Ajayan, P. M.; Tour, J. M. Boron- and Nitrogen-Doped Graphene Quantum Dots/Graphene Hybrid Nanoplatelets as Efficient Electrocatalysts for Oxygen Reduction. ACS Nano 2014, 8, 10837-10843.

Li, L.; Wu, G.; Hong, T.; Yin, Z.; Sun, D.; Abdel-Halim, E. S.; Zhu, J. Graphene Quantum Dots as Fluorescence Probes for Turn-off Sensing of Melamine in the Presence of Hg2+. ACS Appl. Mater. Interfaces 2014, 6, 2858-2864.

Zhou, X.; Wang, A.; Yu, C.; Wu, S.; Shen, J. Facile Synthesis of Molecularly Imprinted Graphene Quantum Dots for the Determination of Dopamine with Affinity-Adjustable. ACS Appl. Mater. Interfaces, 2015, 7 (22), pp. 11741-11747.

\* cited by examiner

BANDGAP ENGINEERING OF CARBON QUANTUM DOTS

CROSS-REFERENCE TO RELATED APPLICATIONS

This application claims priority to U.S. Provisional Patent Application No. 62/014,627, filed on Jun. 19, 2014. In addition, this application is related to International Patent Application No. PCT/US2014/036604, filed on May 2, 2014, which claims priority to U.S. Provisional Patent Application No. 61/818,800, filed on May 2, 2013. The entirety of each of the aforementioned applications is incorporated herein by reference.

STATEMENT REGARDING FEDERALLY SPONSORED RESEARCH

This invention was made with government support under Grants Nos. FA9550-09-1-0581 and FA9550-14-1-0111, both awarded by the U.S. Department of Defense. The government has certain rights in the invention.

BACKGROUND

Current methods of forming carbon quantum dots with tailored bandgaps have numerous limitations in terms of costs, efficiency, reaction conditions, and scalability. As such, a need exists for more effective methods of making carbon quantum dots with desired bandgaps.

SUMMARY

In some embodiments, the present disclosure pertains to scalable methods of producing carbon quantum dots with desired bandgaps. In some embodiments, the methods of the present disclosure include a step of exposing a carbon source to an oxidant at a reaction temperature, where the exposing results in the formation of the carbon quantum dots. The methods of the present disclosure also include a step of selecting a desired size of the formed carbon quantum dots.

In some embodiments, the desired size of carbon quantum dots includes a size range. In some embodiments, the desired size of the carbon quantum dots ranges from about 1 nm to about 200 nm in diameter, from about 1 nm to about 100 nm in diameter, or from about 2 nm to about 80 nm in diameter.

In some embodiments, carbon quantum dot size selection occurs by selecting the reaction temperature that produces the desired size of the formed carbon quantum dots. In some embodiments, the selected reaction temperature is a set temperature that remains constant during the exposing step. In some embodiments, the selected reaction temperature is a temperature gradient that gradually increases or decreases during the exposing step. In some embodiments, the selected reaction temperature ranges from about 25° C. to about 200° C., from about 50° C. to about 150° C., or from about 100° C. to about 150° C. In some embodiments, the desired size of the carbon quantum dots decreases as the selected reaction temperature increases.

In some embodiments, carbon quantum dot size selection occurs by separating the desired size of the formed carbon quantum dots from other formed carbon quantum dots. In some embodiments, the separation occurs by filtration, such as cross-flow ultrafiltration. In some embodiments, the filtration occurs sequentially through multiple porous membranes that have different pore sizes. In some embodiments, the separation occurs through dialysis or repetitive dialyses.

In some embodiments, the carbon source that is used to make carbon quantum dots includes, without limitation, coal, coke, graphite, carbon nanotubes, activated carbon, carbon black, fullerenes, and combinations thereof. In some embodiments, the oxidant that is exposed to the carbon source includes an acid, such as sulfuric acid, nitric acid, and combinations thereof.

In some embodiments, the methods of the present disclosure also include a step of purifying the formed carbon quantum dots. In some embodiments, the purifying step includes, without limitation, extraction, filtration, evaporation, precipitation, dialysis, and combinations thereof.

In some embodiments, the methods of the present disclosure also include a step of enhancing the quantum yield of the formed carbon quantum dots. In some embodiments, the enhancing occurs by hydrothermal treatment of the carbon quantum dots, treatment of the carbon quantum dots with one or more bases, treatment of the carbon quantum dots with one or more hydroxides, treatment of the carbon quantum dots with one or more dopants, treatment of the carbon quantum dots with one or more reducing agents, and combinations thereof.

The methods of the present disclosure can be utilized to produce various types of carbon quantum dots with various desired bandgaps. In some embodiments, the formed carbon quantum dots include graphene quantum dots. In some embodiments, the formed carbon quantum dots have a crystalline hexagonal structure. In some embodiments, the formed carbon quantum dots are photoluminescent. In some embodiments, the formed carbon quantum dots are functionalized with a plurality of functional groups. In some embodiments, the formed carbon quantum dots are edge functionalized.

The methods of the present disclosure can also be used to produce carbon quantum dots in a scalable manner. For instance, in some embodiments, the methods of the present disclosure form carbon quantum dots in bulk quantities that range from about 1 g of carbon quantum dots to about 10 tons of carbon quantum dots.

DESCRIPTION OF THE FIGURES

FIG. 2A is a schematic illustration of GQD synthesis. FIG. 2B is a schematic illustration of the separation of GQDs using cross-flow ultrafiltration. Transmission electron microscopy (TEM) images of the separated GQDs are also shown, including GQDs-S4.5 (FIG. 2C), GQDs-S16 (FIG. 2D), GQDs-S41 (FIG. 2E) and GQDs-S70 (FIG. 2F). FIG. 2G provides a summary of size distributions of GQDs-S4.5, GQDs-S16, GQDs-S41 and GQDs-S70, as determined by TEM.

FIG. 5A provides an X-ray photoelectron spectroscopy (XPS) survey of GQDs-S4.5, GQDs-S16, GQDs-S41 and GQDs-S70 with Au as the reference. C1s high resolution XPS spectra of GQDs-S4.5 (FIG. 5B), GQDs-S16 (FIG. 5C), GQDs-S41 (FIG. 5D) and GQDs-S70 (FIG. 5E) are also shown. FIG. 5F provides a summary of percentage elemental contents in different functional groups from FIGS. 5B-5E.

FIG. 8E is a normalized intensity scale bar for FIGS. 8A-D. FIG. 8F is a solution of GQDs under 365 nm excitation UV lamp. From left to right, the vials contain solutions of GQDs-S4.5, GQDs-S16, GQDs-S41, and GQDs-S70, respectively. FIG. 8G compares the relationship between the optical bandgap and GQD size (from TEM) or membrane pore sizes used in the ultrafiltration.

FIG. 10E provides a summary of percentage elemental contents in different functional groups from FIGS. 10A-D.

FIG. 11E provides a summary of size distributions of GQDs from FIGS. 11A-11D.

FIG. 16F provides GQDs solutions under a 365 nm excitation UV lamp. The solutions from left to right are GQDs-T150-7.6, GQDs-T130-25, GQDs-T110-27 and GQDs-T50-54. FIG. 16G provides a summary of the peak intensities at 300 nm and 320 nm excitation wavelengths from FIGS. 16A-D.

DETAILED DESCRIPTION

Figure 1:
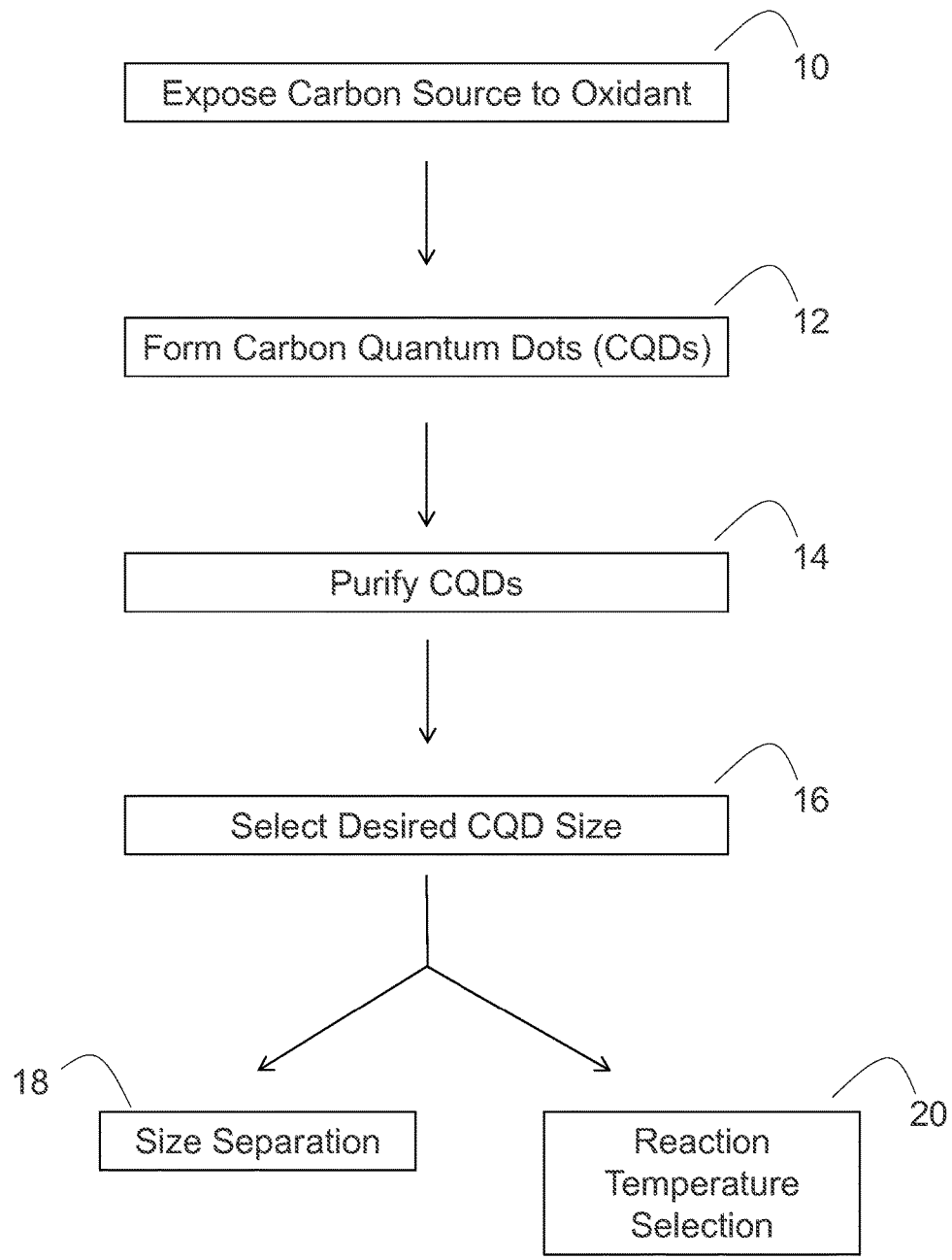
FIG. 1 provides a scheme of a method of making carbon quantum dots (CQDs) with desired bandgaps through size selection.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Tailoring the bandgap of inorganic nanorods and quantum dots by confining the electrons in zero-dimensional (0-D) or one-dimensional (1-D) nanostructures has attracted tremendous research interest and found broad applications in various fields, such as photovoltaics, biomedical and biological imaging, and as light-emitting sources. Conventional methods of tuning the band structure of these materials include a variety of approaches, such as laser molecular beam epitaxy growth of $In_2O_3$ nanoislands, supramolecular assembly of gold nanoparticles, epitaxial deposition of a compressive shell onto CdTe quantum dots, plasma-enhanced chemical vapor deposition of silicon quantum dots, and strain control of $MoS_2$ layers. However, such methods require specific and less accessible instruments or rigid reaction conditions. Furthermore, such methods are usually expensive. Moreover, inorganic quantum dots produced by such methods are usually toxic. As such, the applications of inorganic quantum dots have remained limited.

While the long-studied inorganic quantum dots often have sharper emissions, luminescent carbon-based quantum dots (CQDs) sometimes show superior performance in terms of their high biocompatibility while remaining photostable. CQDs have been shown to have minimal toxicity. Moreover, methods for preparing CQDs with specific bandgaps have been developed. For instance, methods of producing CQDs with specific bandgaps have been developed by the use of chromatography with gradient elution of different mobile phases, cutting of tattered graphite using amines, and element-doping of as-prepared CQDs. However, complex separation techniques, multi-step syntheses or high reagent costs have limited the scalable production of CQDs with desired bandgaps. As such, a need exists for improved methods of producing CQDs with desired bandgaps. Various embodiments of the present disclosure address this need.

In some embodiments, the present disclosure provides a scalable method for producing carbon quantum dots with desired bandgaps. In some embodiments that are illustrated in FIG. 1, the methods of the present disclosure include: exposing a carbon source to an oxidant at a reaction temperature (step 10), where the exposing results in formation of the carbon quantum dots (step 12). In some embodiments, the methods of the present disclosure also include a step of purifying the formed quantum dots (step 14). In some embodiments, the methods of the present disclosure also include a step of selecting a desired size of the formed carbon quantum dots (step 16). In some embodiments, the carbon quantum dot size selection occurs by separating the desired size of the formed carbon quantum dots from other formed carbon quantum dots (step 18), selecting the reaction temperature that produces the desired size of the formed carbon quantum dots (step 20), and combinations of such steps.

As set forth in more detail herein, various methods may be utilized to expose various carbon sources to various oxidants at various reaction temperatures to result in the formation of various amounts and types of carbon quantum dots. Moreover, various methods may be utilized to select desired sizes of the formed carbon quantum dots.

Oxidants

Various oxidants may be utilized to form carbon quantum dots. In some embodiments, the oxidant includes an acid. In some embodiments, the acid includes, without limitation, sulfuric acid, nitric acid, phosphoric acid, hypophosphorous acid, fuming sulfuric acid, hydrochloric acid, oleum, sulfur trioxide in sulfuric acid, chlorosulfonic acid, and combinations thereof.

In some embodiments, the oxidant utilized to form carbon quantum dots is a mixture of sulfuric acid and nitric acid. In some embodiments, the oxidant is nitric acid. In some embodiments, the oxidant only consists of nitric acid. In some embodiments, the oxidant includes, without limitation, potassium permanganate, sodium permanganate, sodium nitrate, hypophosphorous acid, nitric acid, sulfuric acid, hydrogen peroxide, and combinations thereof. In some embodiments, the oxidant is a mixture of potassium permanganate, sulfuric acid, and hypophosphorous acid. In some embodiments, the oxidant includes 20% fuming sulfuric acid. In some embodiments, the oxidant includes 98% sulfuric acid. In some embodiments, the oxidant is a combination of sodium nitrate and nitric acid. The utilization of additional oxidants can also be envisioned.

Carbon Sources

The methods of the present disclosure may utilize various types of carbon sources to form carbon quantum dots. For instance, in some embodiments, the carbon sources include, without limitation, coal, coke, graphite, carbon nanotubes, activated carbon, carbon black, fullerenes, and combinations thereof.

In some embodiments, the carbon source includes coal. Various types of coals may be utilized as carbon sources to form carbon quantum dots. For instance, in some embodiments, the coal includes, without limitation, anthracite, bituminous coal, sub-bituminous coal, metamorphically altered bituminous coal, asphaltenes, asphalt, peat, lignite, steam coal, petrified oil, and combinations thereof. In some embodiments, the carbon source includes anthracite. In some embodiments, the carbon source includes bituminous coal. The use of additional coals as carbon sources can also be envisioned.

In some embodiments, the carbon source includes coke. In some embodiments the coke is made from pitch. In some embodiments, the coke is made from bituminous coals. In some embodiments, the coke is made from pitch and bituminous coals. In some embodiments, the carbon source is a combination of coke and coal. The use of additional carbon sources can also be envisioned.

Exposing of Carbon Sources to Oxidants

Various methods may be utilized to expose carbon sources to oxidants. In some embodiments, the exposing occurs in a solution that contains the oxidant. In some embodiments, the exposing includes sonicating the carbon source in the presence of an oxidant. In some embodiments, the exposing includes stirring a carbon source in the presence of an oxidant. In some embodiments, the exposing includes heating the carbon source in the presence of an oxidant at a reaction temperature. In some embodiments, the reaction temperature is at least about 100° C. In some embodiments, the reaction temperature ranges from about 100° C. to about 150° C.

Carbon sources may be exposed to oxidants for various periods of time. For instance, in some embodiments, the exposing occurs from about 1 minute to about 48 hours. In some embodiments, the exposing occurs from about 1 hour to about 24 hours. In some embodiments, the exposing occurs from about 15 hours to about 24 hours.

In some embodiments, two or more oxidants may be exposed to the carbon source in a sequential manner. For instance, in some embodiments, a first oxidant is mixed with a carbon source. Thereafter, a second oxidant is mixed with the carbon source. In some embodiments, the first oxidant is sulfuric acid and the second oxidant is nitric acid.

In some embodiments, a single oxidant is exposed to a carbon source. In some embodiments, the single oxidant is nitric acid. Additional methods of exposing carbon sources to oxidants can also be envisioned.

Formed Carbon Quantum Dots

The methods of the present disclosure can be used to form various types of carbon quantum dots. Further embodiments of the present disclosure pertain to the formed carbon quantum dots.

In some embodiments, the carbon quantum dots of the present disclosure are in pristine form. In some embodiments, the carbon quantum dots of the present disclosure are un-functionalized. In some embodiments, the carbon quantum dots of the present disclosure are functionalized with a plurality of functional groups. In some embodiments, the functional groups include, without limitation, amorphous carbon, oxygen groups, carbonyl groups, carboxyl groups, aromatic groups, alkane groups, alkene groups, ketone groups, esters, amines, amides, and combinations thereof.

In some embodiments, the carbon quantum dots of the present disclosure are edge functionalized with a plurality of functional groups. In some embodiments, the carbon quantum dots of the present disclosure include oxygen addends on their edges. In some embodiments, the carbon quantum dots of the present disclosure include amorphous carbon addends on their edges. In some embodiments, the carbon quantum dots of the present disclosure include graphene quantum dots.

The carbon quantum dots of the present disclosure can include various layers. For instance, in some embodiments, the carbon quantum dots of the present disclosure have a single layer. In some embodiments, the carbon quantum dots of the present disclosure have a plurality of layers. In some embodiments, the carbon quantum dots of the present disclosure have from about two layers to about four layers.

The carbon quantum dots of the present disclosure can include various structures. For instance, in some embodiments, the carbon quantum dots of the present disclosure have a crystalline hexagonal structure.

The carbon quantum dots of the present disclosure can also have various properties. For instance, in some embodiments, the carbon quantum dots of the present disclosure are photoluminescent. In some embodiments, the carbon quantum dots of the present disclosure emit light from the regions of the human visible spectrum. In some embodiments, the carbon quantum dots of the present disclosure emit light from the blue-green (2.9 eV) to orange-red (2.05 eV) regions of the human visible spectrum.

The carbon quantum dots of the present disclosure can also have various molecular weights. For instance, in some embodiments, the carbon quantum dots of the present disclosure include molecular weights that range from about 20 kD to about 100 kD. In some embodiments, the carbon quantum dots of the present disclosure include molecular weights that range from about 25 kD to about 75 kD. In some embodiments, the carbon quantum dots of the present disclosure include molecular weights that range from about 40 kD to about 60 kD. In some embodiments, the carbon quantum dots of the present disclosure have a molecular weight of about 60 kD.

The carbon quantum dots of the present disclosure can also have various sizes. For instance, in some embodiments, the carbon quantum dots of the present disclosure include sizes that range from about 1 nm in diameter to about 200 nm in diameter. In some embodiments, the carbon quantum dots of the present disclosure include sizes that range from about 2 nm in diameter to about 80 nm in diameter. In some embodiments, the carbon quantum dots of the present disclosure include sizes that range from about 2 nm in diameter to about 65 nm in diameter.

The carbon quantum dots of the present disclosure can also have various quantum yields. For instance, in some embodiments, the quantum yields of the carbon quantum dots are less than 1% and greater than 0.1%. In some embodiments, the quantum yields of the carbon quantum dots are between 1% and 10%. In some embodiments, the quantum yields of the carbon quantum dots can be as high 50%. In some embodiments, the quantum yields of the carbon quantum dots may be near 100%.

Selecting Desired Carbon Quantum Dot Sizes

The methods of the present disclosure can also include one or more steps of selecting a desired size of carbon quantum dots. In some embodiments, the desired size includes a size range. In some embodiments, the desired size includes a narrow size range. In some embodiments, the desired size includes a plurality of sizes. In some embodiments, the desired sizes of the carbon quantum dots include diameters that range from about 55 nm to about 85 nm, from about 45 nm to about 65 nm, from about 30 nm to about 50 nm, from about 20 nm to about 35 nm, from about 20 nm to about 30 nm, from about 10 nm to about 20 nm, from about 5 nm to about 10 nm, from about 2 nm to about 6 nm, from about 2 nm to about 4 nm, or from about 1 nm to about 3 nm.

The present disclosure can utilize various methods to select a desired size of the formed carbon quantum dots. For instance, in some embodiments, the selecting can include at least one of separating the desired size of the formed carbon quantum dots from other formed carbon quantum dots, selecting the reaction temperature that produces the desired size of the formed carbon quantum dots, and combinations of such steps.

Temperature Selection

In some embodiments, a desired size of carbon quantum dots is selected by selecting a reaction temperature that produces the desired size of the formed carbon quantum dots. In some embodiments, the selected reaction temperature is a set temperature that remains constant during the exposing step. In some embodiments, the selected reaction temperature is a temperature gradient. For instance, in some embodiments, the temperature gradient gradually increases during the exposing step. In some embodiments, the temperature gradient gradually decreases during the exposing step.

In some embodiments, the selected reaction temperature ranges from about 25° C. to about 200° C. In some embodiments, the selected reaction temperature ranges from about 50° C. to about 150° C. In some embodiments, the selected reaction temperature ranges from about 100° C. to about 150° C.

In some embodiments, the desired size of the carbon quantum dots decreases as the selected reaction temperature increases. For instance, in some embodiments where the selected reaction temperature is about 50° C., the selected reaction temperature produces carbon quantum dots with diameters that range from about 45 nm to about 65 nm. In some embodiments where the selected reaction temperature is about 110° C., the selected reaction temperature produces carbon quantum dots with diameters that range from about 20 nm to about 35 nm. In some embodiments where the selected reaction temperature is about 130° C., the selected reaction temperature produces carbon quantum dots with diameters that range from about 20 nm to about 30 nm. In some embodiments where the selected reaction temperature is about 150° C., the selected reaction temperature produces carbon quantum dots with diameters that range from about 5 nm to about 10 nm.

In some embodiments, the functionalization level of carbon quantum dots increases as the selected reaction temperature increases. For instance, in some embodiments, carbon quantum dots become more oxidized as the reaction temperature increases. In some embodiments, the bandgap of the carbon quantum dots also increases as the selected reaction temperature increases.

Separation

In some embodiments, a desired size of carbon quantum dots is selected by separating the desired size of the formed carbon quantum dots from other formed carbon quantum dots. As set forth in more detail herein, various separation methods may be utilized.

In some embodiments, the separation occurs by filtration. In some embodiments, the filtration includes, without limitation, macrofiltration, microfiltration, ultrafiltration, cross-flow filtration, cross-flow ultrafiltration, dialysis, membrane filtration, and combinations of such steps. In some embodiments, the filtration occurs by cross-flow filtration, such as cross-flow ultrafiltration.

In some embodiments, the filtration occurs through a porous membrane. In some embodiments, the porous membrane includes pore sizes that range from about 1 kD to about 100 kD. In some embodiments, the pore sizes range from about 1 kD to about 50 kD. In some embodiments, the pore sizes range from about 3 kD to about 30 kD.

In some embodiments, the filtration occurs sequentially through multiple porous membranes. For instance, in some embodiments, a solution containing formed carbon quantum dots is filtered through a first porous membrane. The filtered solution is then filtered through second porous membrane. Thereafter, the filtered solution is filtered through a third porous membrane. In some embodiments, the porous membranes that are utilized in sequential filtration steps have different pore sizes. In some embodiments, the porous membranes that are utilized in sequential filtration steps have sequentially increasing pore sizes. For instance, in some embodiments, the first, second and third porous membranes have pore sizes of about 3 kD, 10 kD, and 30 kD, respectively.

Filtration can occur under various conditions. For instance, in some embodiments, filtration occurs at transmembrane pressures that range from about 0.1 atmospheric pressure to about 10 atmospheric pressure. In some embodiments, filtration occurs at transmembrane pressures that range from about 0.5 atmospheric pressure to about 2 atmospheric pressure. In some embodiments, filtration occurs at about 1 atmospheric pressure.

Purification of Carbon Quantum Dots

In some embodiments, the methods of the present disclosure also include a step of purifying the formed carbon quantum dots (e.g., purification from oxidants in a solution). In some embodiments, the purifying occurs prior to, during, or after a step of selecting the desired size of the formed carbon quantum dots. In some embodiments, the purifying step includes, without limitation, extraction, filtration, evaporation, precipitation, dialysis, and combinations thereof.

In some embodiments, the purifying step includes neutralizing a solution that contains the formed carbon quantum dots, filtering the solution, and dialyzing the solution. In some embodiments, the purifying step includes dialyzing a solution that contains the formed carbon quantum dots. In some embodiments, the purifying step includes extracting the formed carbon quantum dots from a reaction mixture (e.g., a solution). In some embodiments, the extraction utilizes organic solvents, such as ethyl acetate or 2-butanol, or combinations of ethyl acetate and 2-butanol. Additional methods of purifying formed carbon quantum dots can also be envisioned.

Quantum Yield Enhancement of Carbon Quantum Dots

In some embodiments, the methods of the present disclosure also include a step of enhancing the quantum yield of the formed carbon quantum dots. In some embodiments, the enhancement step occurs prior to, during, or after a step of selecting the desired size of the formed carbon quantum dots.

Various methods may be utilized to enhance the quantum yield of carbon quantum dots. Exemplary methods include, without limitation, hydrothermal treatment of the carbon quantum dots, treatment of the carbon quantum dots with one or more bases (e.g., sodium hydroxide), treatment of the carbon quantum dots with one or more hydroxides, treatment of the carbon quantum dots with one or more dopants (e.g., $NaH_2PO_3$), treatment of the carbon quantum dots with one or more reducing agents, and combinations thereof.

In some embodiments, the enhancement of the quantum yield of carbon quantum dots occurs by hydrothermal treatment of the carbon quantum dots. In some embodiments, the hydrothermal treatment includes treating the carbon quantum dots with hydroxide in water to increase their quantum yield. In some embodiments, the hydrothermal treatment of the carbon quantum dots involves treating the carbon quantum dots with water under pressure in a container (e.g., a sealed vessel) at temperatures above 100° C. (e.g., temperatures of about 180° C. to 200° C.).

In some embodiments, the enhancement of the quantum yield of the carbon quantum dots occurs by treatment of the carbon quantum dots with one or more reducing agents. In some embodiments, the reducing agents include, without limitation, hydrazine, sodium borohydride, heat, light, sulfur, sodium sulfide, sodium hydrogen sulfide, and combinations thereof.

In some embodiments, the enhancement step enhances the quantum yield of the carbon quantum dots by at least about 50%, at least about 100%, at least about 200%, or at least about 500%. In some embodiments, the enhancement step enhances the quantum yield of the carbon quantum dots by at least about 50%. In some embodiments, the enhancement step enhances the quantum yield of the carbon quantum from about 0.1% to about 50%.

Advantages

By selecting desired sizes of carbon quantum dots, the methods of the present disclosure can be utilized to tune the bandgaps of the formed carbon quantum dots. As such, the methods of the present disclosure can be utilized to produce carbon quantum dots with desired bandgaps. For instance, in some embodiments, the bandgaps of the carbon quantum dots range from about 0.5 eV to about 5 eV. In some embodiments, the bandgaps of the carbon quantum dots range from about 1 eV to about 5 eV. In some embodiments, the bandgaps of the carbon quantum dots range from about 1 eV to about 5 eV. In some embodiments, the bandgaps of the carbon quantum dots range from about 0.5 eV to about 3 eV. In some embodiments, the bandgaps of the carbon quantum dots range from about 1 eV to about 3 eV. In some embodiments, the bandgaps of the carbon quantum dots range from about 2 eV to about 3 eV. In some embodiments, the bandgaps of the carbon quantum dots are less than about 1.5 eV. In some embodiments, the bandgaps of the carbon quantum dots are less than about 3 eV.

Furthermore, the methods of the present disclosure can be utilized to form carbon quantum dots with desired bandgaps in a scalable manner. For instance, in some embodiments, the methods of the present disclosure can form carbon quantum dots in bulk quantities. In some embodiments, the bulk quantities range from about 1 g of carbon quantum dots to about 10 tons of carbon quantum dots. In some embodiments, the bulk quantities are more than about 1 g of carbon quantum dots. In some embodiments, the bulk quantities are more than about 500 g of carbon quantum dots. In some embodiments, the bulk quantities are more than about 1 kg of carbon quantum dots.

Additional Embodiments

Reference will now be made to additional embodiments of the present disclosure and experimental results that provide support for such embodiments. However, Applicants note that the disclosure below is for illustrative purposes only and is not intended to limit the scope of the claimed subject matter in any way.

EXAMPLE 1

Bandgap Engineering of Coal-Derived Graphene Quantum Dots

In this Example, bandgaps of photoluminescent graphene quantum dots (GQDs) synthesized from anthracite have been engineered by controlling the size of GQDs in two ways: either chemical oxidative treatment and separation by cross-flow ultrafiltration, or by a facile one-step chemical synthesis using successively higher temperatures to render smaller GQDs. Using these methods, GQDs were synthesized with tailored sizes and bandgaps. The GQDs emit light from blue-green (2.9 eV) to orange-red (2.05 eV), depending on size, functionalities and defects. These findings provide a deeper insight into the nature of coal-derived GQDs and demonstrate a scalable method for production of GQDs with the desired bandgaps.

In a first approach, the GQDs were rapidly purified using cross-flow ultrafiltration to separate them by size via variation of the membrane pore size. Such cross-flow ultrafiltration is used in very large-scale industrial processes for industrial and municipal water purification and for food separations. The emission wavelengths of the purified GQDs depend on their sizes, in accordance with the quantum confinement effect, and on their functionalities and defects.

In a second approach, instead of using ultrafiltration, Applicants engineered the bandgaps of the GQDs by controlling the reaction temperature of the oxidation process, resulting in the synthesis of temperature-defined sizes of GQDs with fluorescence properties covering the visible spectrum. The higher the temperature, the smaller the GQDs, underscoring the facility with which the domain sizes could be controllable through oxidative cutting.

Figure 2:
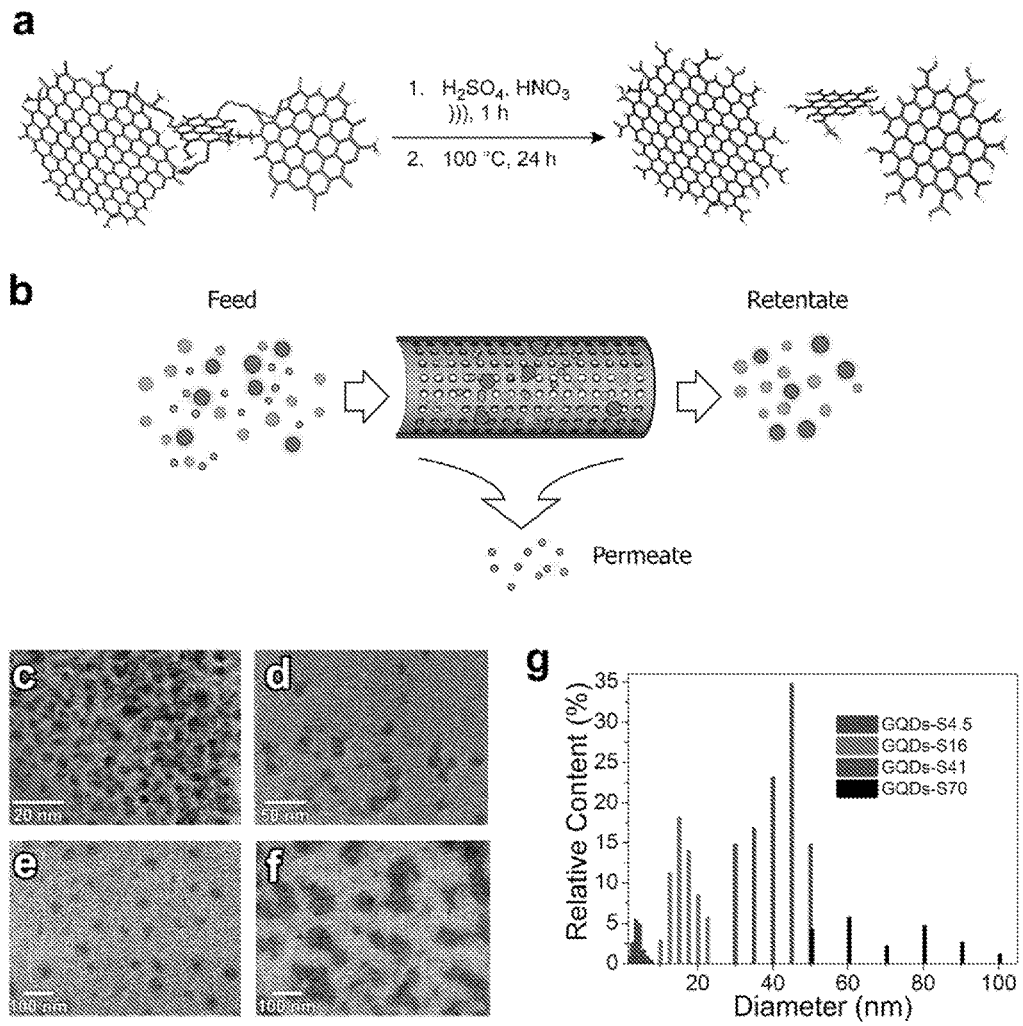
FIG. 2 provides illustrations and data relating to the production and size-separation of graphene quantum dots (GQDs).

In the first reaction protocol, using an oxidative chemical reaction and the cross-flow ultrafiltration process, GQDs with different sizes were prepared. As shown in FIG. 2A, raw anthracite is first dispersed in a mixed solvent of sulfuric acid and nitric acid, and then heated at a defined temperature for 24 hours, which results in a clear solution. After purification, the GQD solution was processed with a cross-flow system (FIG. 2B) using sequentially 3 kD, 10 kD and 30 kD pore size membranes at ~1 atm transmembrane pressure (TMP).

FIGS. 2C-F show the transmission electron microscopy (TEM) images of the as-separated GQDs and their corresponding sizes. The hydrodynamic diameters obtained from TEM and dynamic light scattering (DLS) analyses are summarized in FIGS. 2G and 3, respectively.

The size distribution in FIG. 2G is statistically averaged from the TEM images with a sample size of ~150 particles. The distribution of hydrodynamic diameters was calculated from the light scattering in bulk solution. After the purification process, TEM images reveal that GQDs with average sizes of 4.5±1.2, 16±3.3, 41±6.4 and 70±15 nm were obtained. The corresponding hydrodynamic diameters were 10±2.5, 27±7.9, 41±11 and 76±18 nm, respectively. The enlarged size in the DLS analyses was attributed to the hydration layers around the GQDs. The corresponding GQD batches are denoted as GQDs-Sx, where "S" signifies "separated" and "x" indicates the average diameter from TEM images.

Two solid state NMR experiments employing magic angle spinning (MAS) were used to study the materials: direct $^{13}C$ pulse and $^{1}H$-$^{13}C$ cross polarization (CP). The latter is normally sufficient for characterization of proton-rich materials. However, for the materials studied here (with potentially large proton-deficient regions), the direct $^{13}C$ pulse approach was also used.

Figure 4:
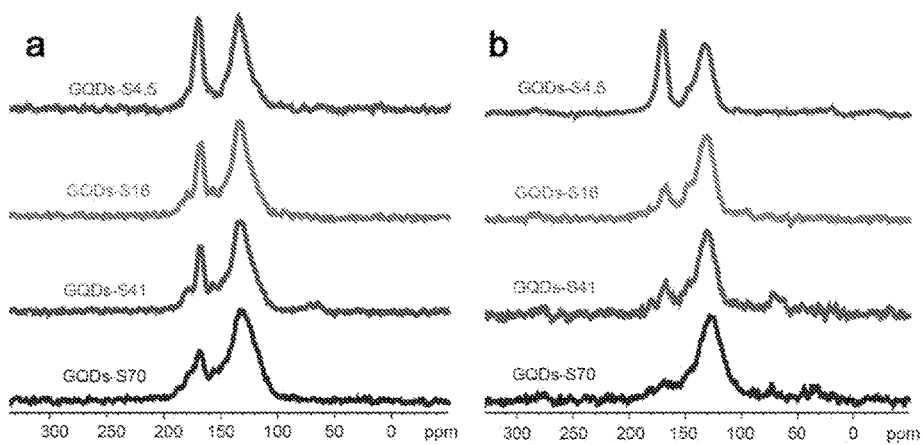
FIG. 4 provides direct $^{13}C$ pulse magic-angle spinning nuclear magnetic resonance (MAS NMR) (FIG. 4A) and cross-polarization $^{13}C$ MAS NMR (FIG. 4B) spectra of GQDs-S4.5, GQDs-S16, GQDs-S41 and GQDs-S70.
Figure 5:
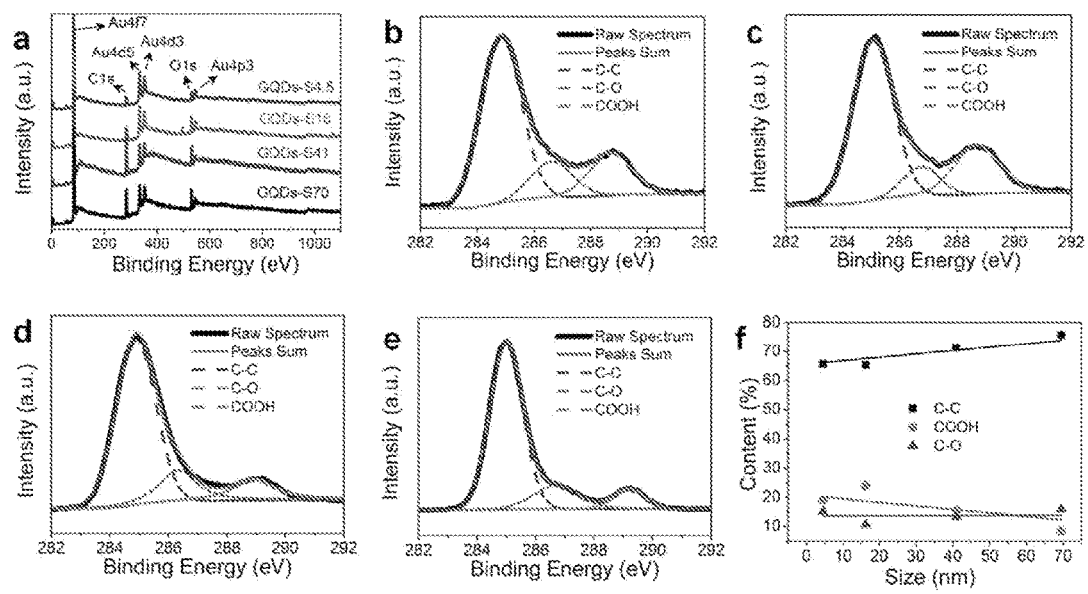
FIG. 5 provides various data relating to synthesized GQDs.
Figure 6:
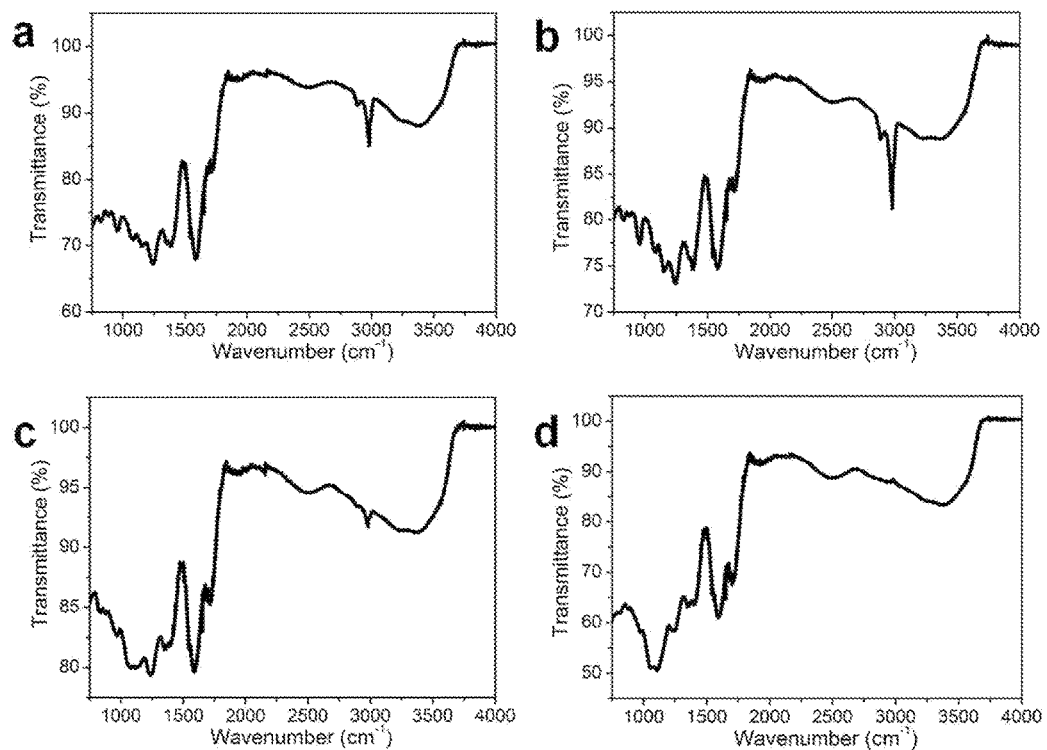
FIG. 6 provides solid state Fourier transform infrared (FTIR) spectra of GQDs-S4.5 (FIG. 6A), GQDs-S16 (FIG. 6B), GQDs-S41 (FIG. 6C), and GQDs-S70 (FIG. 6D).

For each type of experiment, a survey spectrum was obtained with a single set of parameters (FIG. 4) in order to obtain at least qualitative information about each GQD sample. Each experiment reveals a prominent band with a peak maximum at ~130 ppm from aromatic and alkene groups. A signal at ~170 ppm, most likely from carbonyl groups, is also apparent in most spectra. For each sample, the relative intensities of the aromatic/alkene and carbonyl signals clearly differ in the direct $^{13}C$ pulse and CP spectra. Attempting quantitative interpretation would require CP spectra obtained at multiple contact times and direct $^{13}C$ pulse spectra obtained with multiple relaxation delays. Nevertheless, it is apparent from these survey spectra that, as the GQD size increases, a much wider variety of carbonyl environments is generated (as apparent from the direct $^{13}C$ pulse spectra), including ketone and carboxyl functional groups. However, the CP spectra indicate that the carbonyl groups in the larger GQDs do not cross polarize as well as in the smallest GQDs.

As the GQDs become larger, the relative content of carbonyl groups becomes smaller. Likewise, the effect of neighboring protons on peak intensity becomes small as the GQDs become larger. These results are consistent with the oxidized graphitic structure of coal-derived GQDs.

The chemical structures of GQDs were further confirmed by X-ray photoelectron spectroscopy (XPS) analyses and Fourier transform infrared (FTIR) analyses. The XPS survey of GQDs of different sizes (FIG. 5A) indicates that the GQDs primarily consist of carbon and oxygen. As shown in FIGS. 5B-E, the high resolution C1s XPS spectra of GQDs show the presence of COOH and C—O peaks at 288.8 eV and 286.6 eV, respectively. The relative abundances of these functionalities are summarized in FIG. 5F. The quantitative assessment of relative aromatic/alkene to carbonyl ratios is not as descriptive as in the NMR experiments. In the FTIR spectra shown in FIGS. 6A-D, C-H stretching modes appear at ~2980 cm$^{-1}$ in the small GQDs, whereas such functionality becomes less detectable as the size of the GQDs increases. This is attributed to the decreasing abundance of edge C—H stretching as the GQDs became larger. The carbonyl stretches are clearly seen, but assigning relative intensities between samples is difficult.

Figure 7:
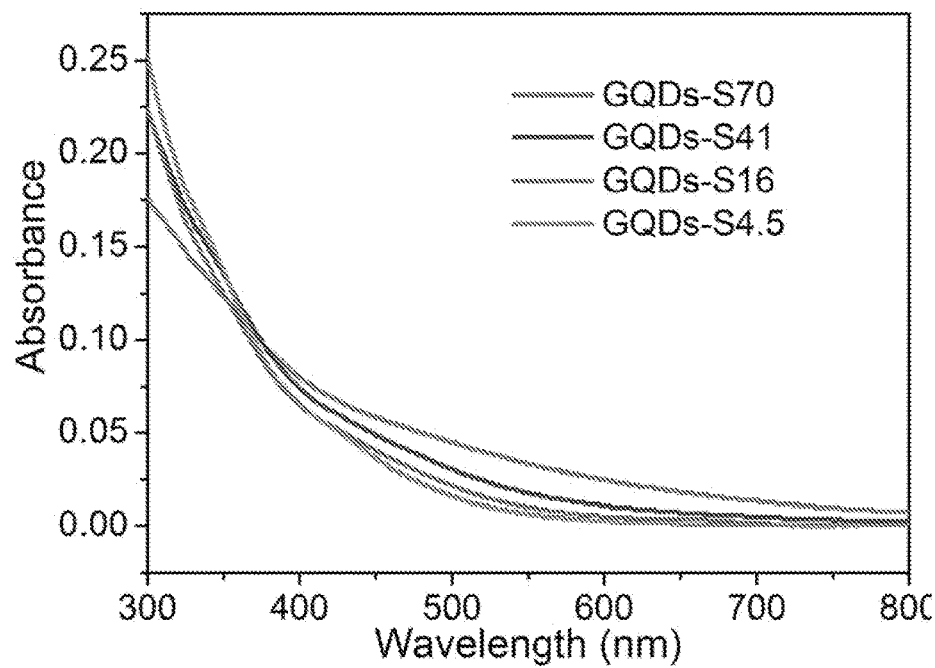
FIG. 7 provides UV-Vis absorption of GQDs-S4.5, GQDs-S16, GQDs-S41 and GQDs-S70.
Figure 8:
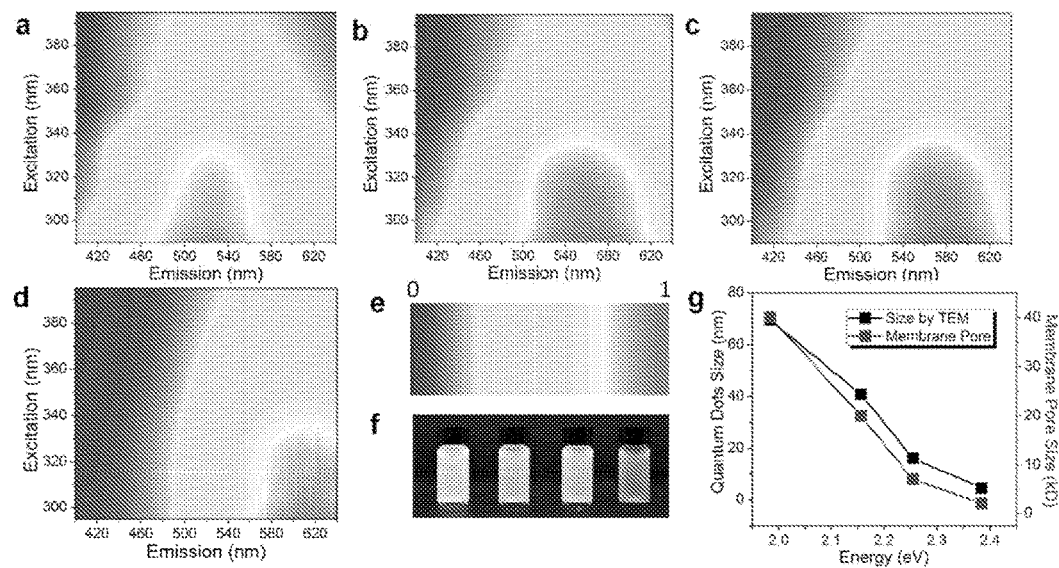
FIG. 8 provides 2-D excitation-emission contour maps of GQDs-S4.5 (FIG. 8A), GQDs-S16 (FIG. 8B), GQDs-S41 (FIG. 8C) and GQDs-S70 (FIG. 8D), all at ~80 mg/L in water at pH 6.

The effectiveness of separating GQDs by cross-flow ultrafiltration was further assessed by studying the photophysical properties of the separated GQDs. FIG. 7 shows the UV-visible absorption of the GQDs. Larger GQDs tend to absorb at longer wavelengths, while the absorption of smaller GQDs is blue-shifted. The broad absorption of larger GQDs is attributed to the complexity of the electronic states.

FIGS. 8A-E show the 2-D excitation-emission contour maps of the GQDs. Under a 365 nm UV light, these quantum dots solutions emit light across the majority of the visible spectrum from green (~2.4 eV) to orange-red (~1.9 eV) regions (FIG. 8F). The correlations between bandgap and size or molecular weight cut-off are summarized in FIG. 8G. As expected, when the GQDs size increases from 4.5 nm to 70 nm, the peak emission is red-shifted from ~520 nm to ~620 nm, which is in accordance with the quantum confinement effect. These GQDs exhibit different fluorescent quantum yields of 1.1%, 0.89%, 0.65% and 0.38% using quinine sulfate as reference standard, as the GQDs size increases from 4.5 nm to 70 nm.

The decrease of quantum yield as the size increases suggests that the fluorescence is affected by the defects in the GQDs since the larger GQDs have fewer defect sites per unit area induced by oxidation and consequently becomes less emissive. The low quantum yields of these GQDs are similar to the published data.

Figure 9:
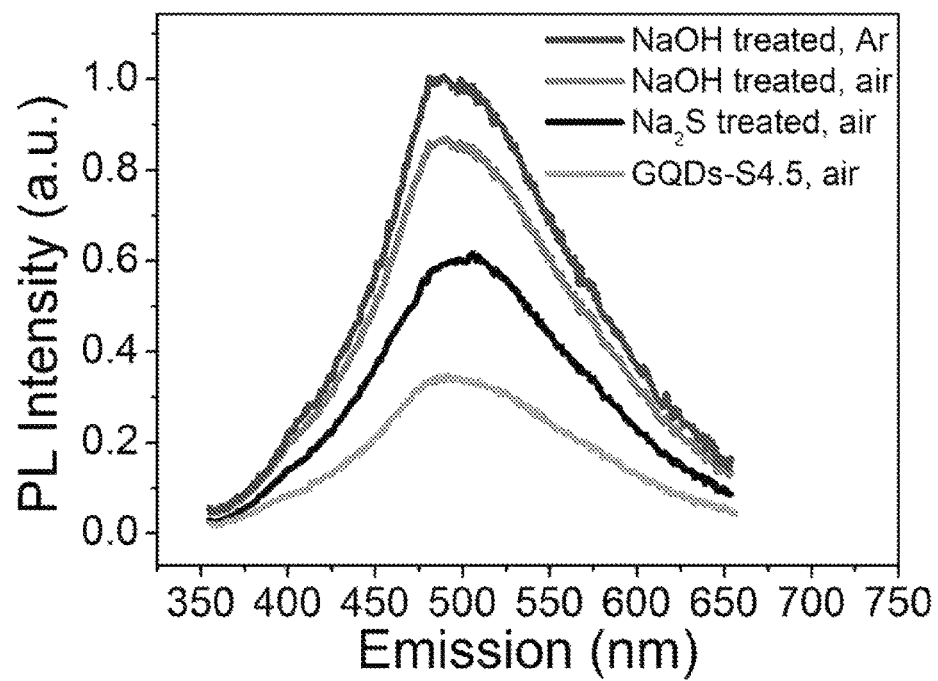
FIG. 9 provides a comparison of the photoluminescence of GQDs-S4.5 before and after NaOH or $Na_2S$ treatment.

As reported previously, a simple hydrothermal treatment in base improves the quantum yields. For example, heating GQDs-S4.5 in 0.2 M aqueous NaOH solution raises the quantum yield to 8.1% or 10%, in air or argon, respectively (FIG. 9). Similar enhancement was observed when treating GQDs in 1 M aqueous Na$_2$S at 100° C. for 1 day. For example, the quantum yield of GQDs-S4.5 increases by about five times after $Na_2S$ treatment (FIG. 9).

The separation technique can efficiently produce GQDs with controlled sizes. For example, the relative yields of GQDs-S4.5, GQDs-S16, GQDs-S41 and GQDs-S70 were 8%, 30%, 52% and 10%, respectively. This represents a 1.6%, 6%, 10% and 2% yield by weight starting from anthracite. Therefore, the overall yield of GQDs is about 20%.

Figure 11:
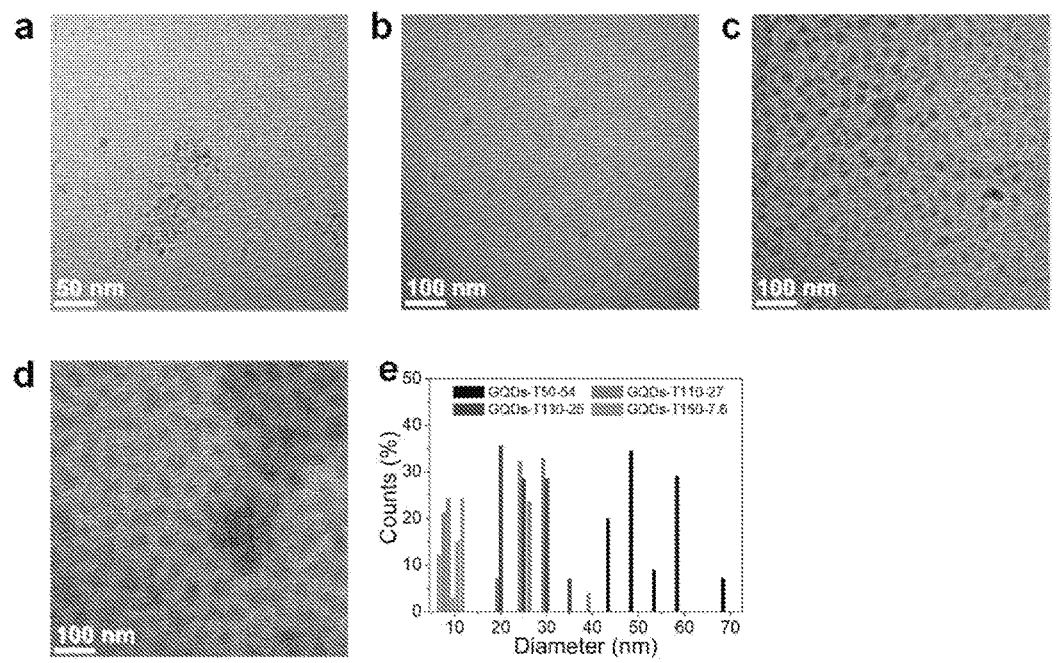
FIG. 11 provides TEM images of GQDs synthesized at different temperatures, including GQDs-T150-7.6 (FIG. 11A), GQDs-T130-25 (FIG. 11B), GQDs-T110-27 (FIG. 11C), and GQDs-T50-54 (FIG. 11D). The corresponding average diameters from the TEM images are 7.6±1.8, 25±5.0, 27±3.8 and 54±7.2nm, respectively.
Figure 12:
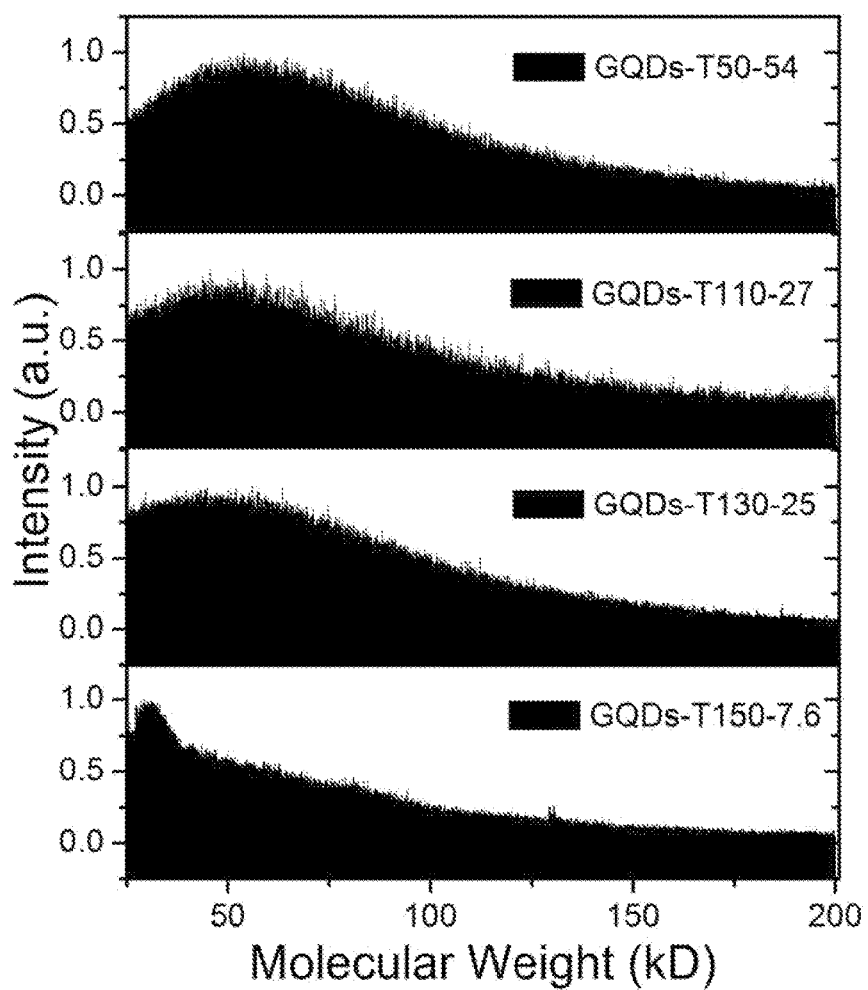
FIG. 12 provides matrix-assisted laser desorption/ionization mass spectrometry (MALDI-MS) of GQDs synthesized at different temperatures. The average diameter of the GQDs was 54±7.2, 27±3.8, 25±5.0, and 7.6±1.8 nm as the synthesis temperature rose from 50° C. to 150° C. (from top to bottom in the Figure). The corresponding molecular weights of the GQDs peaks were 60, 49, 44 and 27 kD, respectively.

The second method used to tailor the size of the GQDs samples was through direct synthesis techniques rather than separation. This facile method for the production of size-differentiated GQDs, in one step without cross-flow ultrafiltration, is based on control of the reaction temperature. The GQDs synthesized at different temperatures for 24 hours are denoted as GQDs-Tx-y, where "T" signifies "temperature", "x" indicates the synthesis temperature, and "y" signifies the TEM-derived size. The higher temperature produces more oxidation and etches the GQDs into smaller sizes, leading to an enlarged bandgap. The change in GQD size is shown in the TEM images (FIG. 11), where the average diameter of the GQDs are 54±7.2, 27±3.8, 25±5.0 and 7.6±1.8 nm as the synthesis temperature rose from 50° C. to 110° C., 130° C. and 150° C., respectively. The corresponding molecular weights of the GQDs peaks were 60, 49, 44 and 27 kD, as determined by MALDI-MS (FIG. 12).

Figure 13:
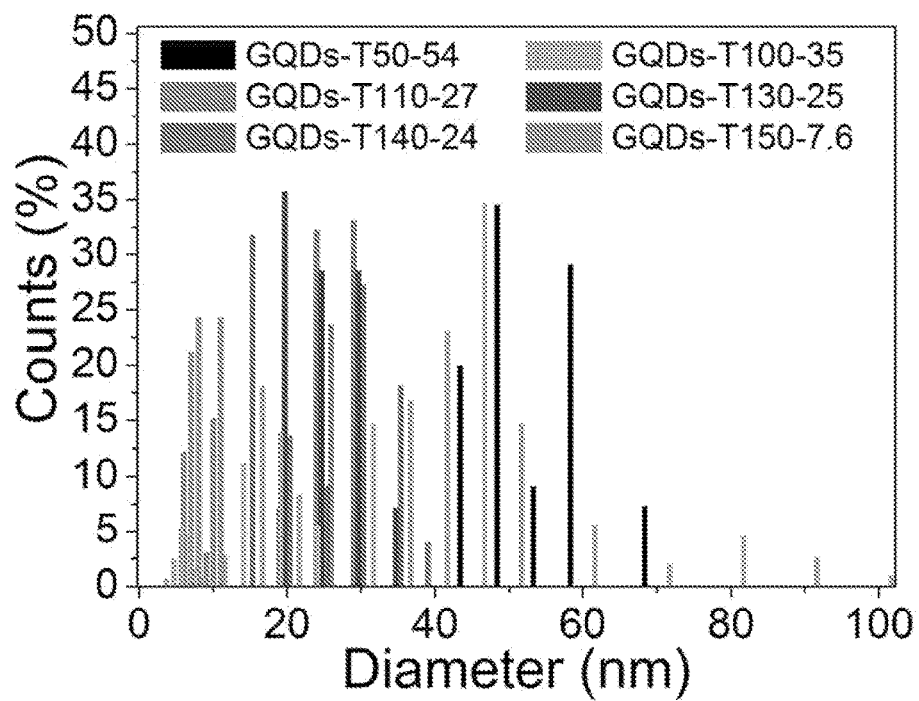
FIG. 13 provides a composite plot of FIGS. 2G and 9E. GQDs-T100-35 is composed of GQDs-S4.5, GQDs-S16, GQDs-S41 and GQDs-S70. Comparing all the GQDs synthesized at different temperatures, GQDs-T100-35 contains particles at sizes between 4.5 nm and 80 nm, but the amounts are small. The main trend is that, as the temperature increases, the major peaks shift to the lower diameters.

As expected, the diameters determined by TEM for the cross-flow ultrafiltered GQDs that were prepared at 100° C. fit well into the range of GQDs synthesized at different temperatures. This becomes more apparent when FIGS. 2G and 11E are made into a composite plot (FIG. 13). The functionality ratios on the GQDs also change with the synthesis temperature.

Figure 14:
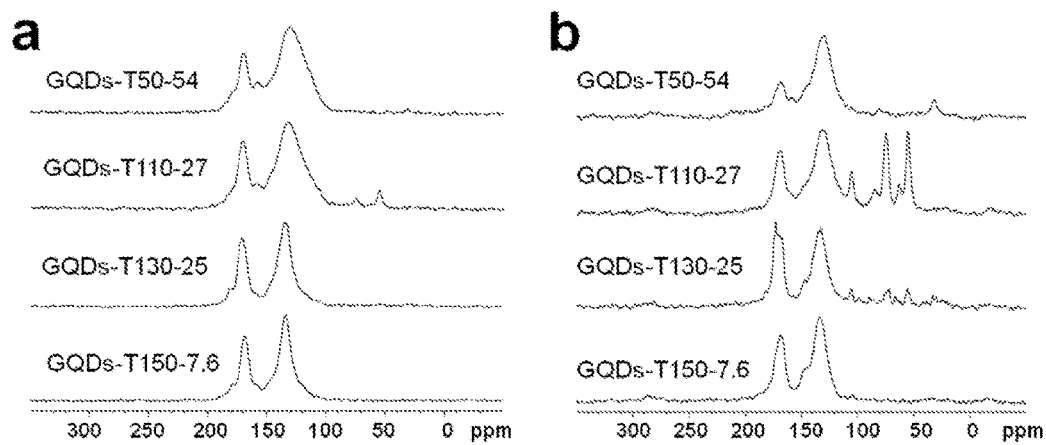
FIG. 14 provides direct $^{13}C$ pulse MAS NMR (FIG. 14A) and cross-polarization $^{13}C$ MAS NMR spectra (FIG. 14B) of GQDs-T50-54, GQDs-T110-27, GQDs-T130-25 and GQDs-T150-7.6. The cross-polarization spectrum of GQD-T110-27 shows enhancement due to aliphatic impurities.

Similar to the $^{13}C$ MAS NMR GQDs separated by cross-flow ultrafiltration, these GQDs synthesized at different temperatures show primarily the existence of carbonyl groups and aromatic/alkene groups at ~170 ppm and 130 ppm, respectively (FIG. 14). Raising the synthesis temperature to 150° C. results in a more uniform structure, as the aromatic/alkene and carbonyl signals significantly sharpen. Differences between the direct $^{13}C$ pulse spectrum and the cross polarization spectrum are particularly noticeable for GQDs-T110-27. In the direct $^{13}C$ pulse experiment, the aliphatic carbons apparently have very long $^{13}C$ spin-lattice relaxation times and thus give very weak signals. In the $^{1}H$-$^{13}C$ cross polarization experiment, a much shorter $^{1}H$ spin-lattice relaxation time enables these aliphatic impurities, from various —O—C($sp^3$) and —O—C($sp^3$)-O— environments, to be much more readily detected.

As shown in FIGS. 10A-E, the high resolution C1s XPS spectra show that the percentage of COOH functionality increases from ~4% to ~22% while the C—C bond content decreases from ~93% to ~65% as the synthesis temperature was increased from 50° C. to 150° C. The corresponding changes in the NMR spectra (stronger signal near 170 ppm and reduced aromatic/alkene intensity) are qualitatively consistent with the XPS results. However, the non-carboxyl C—O content remained constant throughout the temperature range.

Figure 15:
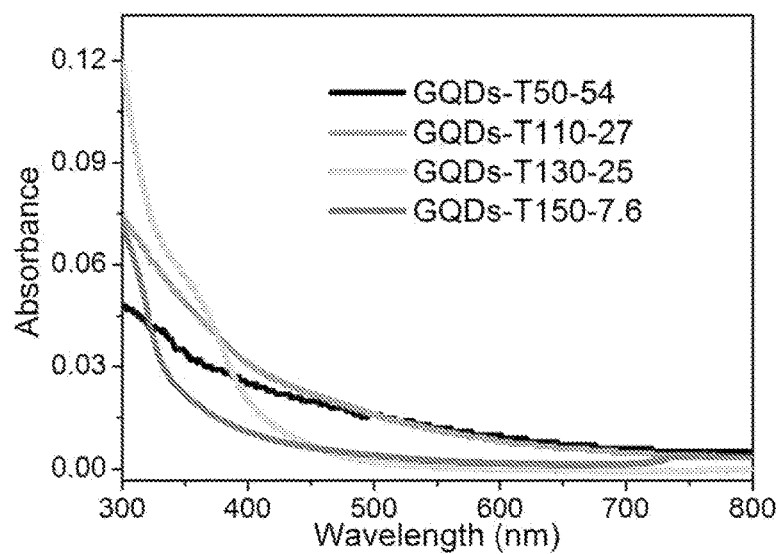
FIG. 15 provides UV-Vis absorption of GQDs-T150-7.6, GQDs-T130-25, GQDs-T110-27 and GQDs-T50-54.
Figure 16:
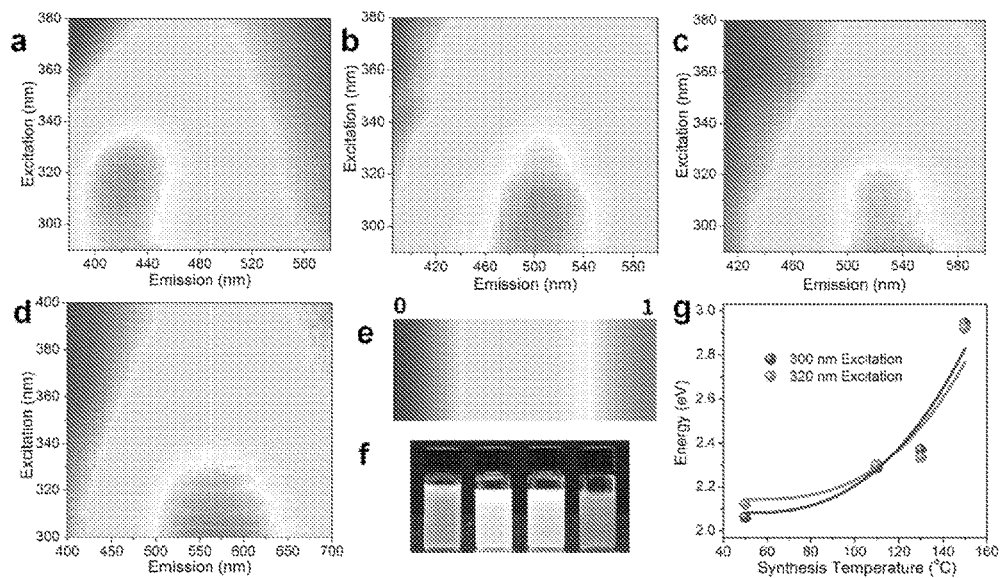
FIG. 16 provides 2D excitation-emission contour map of GQDs-T150-7.6 (FIG. 16A), GQDs-T130-25 (FIG. 16B), GQDs-T110-27 (FIG. 16C), and GQDs-T50-54 (FIG. 16D). The normalized scale bar is shown in (FIG. 16E). The concentration is ~30 mg/L at ~pH 6.

Applicants further examined the UV-visible absorption and 2D excitation-emission of GQDs synthesized at the different temperatures. The absorption spectra of GQDs synthesized at different temperatures (FIG. 15) are similar to the spectra of the GQDs prepared by cross-flow ultrafiltration. At higher synthesis temperatures, the absorption curve slopes were in the low wavelength region. At the low synthesis temperatures, the absorption tends to be broad across the visible region.

Applicants further studied the control of the GQD bandgap through reaction temperature by analyzing the emission properties of GQDs. As shown in FIGS. 16A-E, the emission peak shifts from ~580 nm to ~420 nm as the temperature elevates from 50° C. to 150° C., corresponding to the orange-red and blue-green emission color, respectively. The maximum excitation also shifts from ~320 nm to ~300 nm as the temperature decreases from 150° C. to 50° C. This red-shift in maximum excitation is attributed to the narrowing of the bandgap at lower synthesis temperatures. The change in bandgap is visualized in FIG. 16F, where the GQDs solutions under a 365 nm excitation UV lamp emit from blue-green to orange-red. The temperature effect in bandgap engineering of GQDs is summarized in FIG. 16G. No apparent change occurs in the emission maxima as the excitation wavelength changes from 300 nm to 320 nm. An abrupt increase in bandgap is observed from 130° C. to 150° C.

Figure 10:
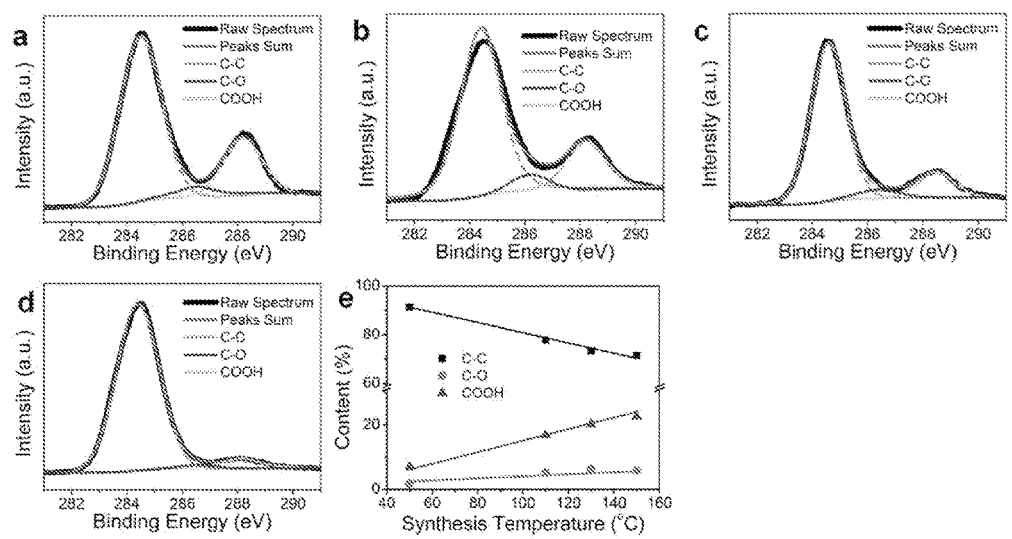
FIG. 10 provides C1s high resolution XPS spectra of GQDs-T150-7.6 (FIG. 10A), GQDs-T130-25 (FIG. 10B), GQDs-T110-27 (FIG. 10C), and GQDs-T50-54 (FIG. 10D).

As summarized in FIG. 10E, the COOH content increases and the C—C content decreases at higher temperature. Without being bound by theory, it is envisioned that the tunable bandgap of GQDs can be attributed to both the size effect and functionality effect.

Figure 17:
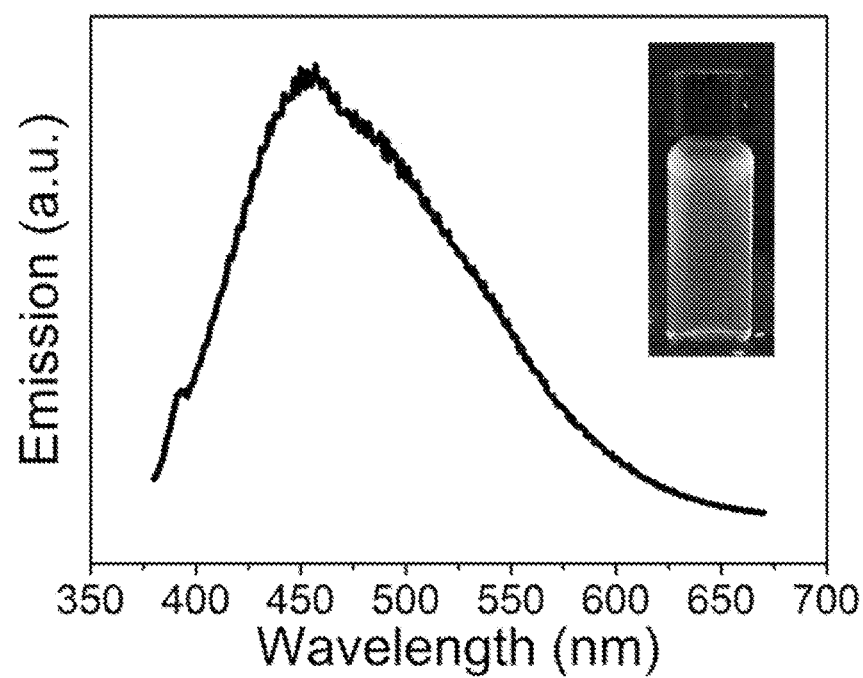
FIG. 17 provides an emission spectrum of GQDs synthesized from bituminous coal at 120° C. (excited at 345 nm). The inset shows the GQDs solution under a 365 nm UV lamp.

Because of the smaller graphitic structure in bituminous coal, direct synthesis of GQDs from bituminous coal with blue emission can be easier. As shown in FIG. 17, GQDs extracted from bituminous coal at 120° C. emit blue light under a 365 nm UV lamp.

Figure 18:
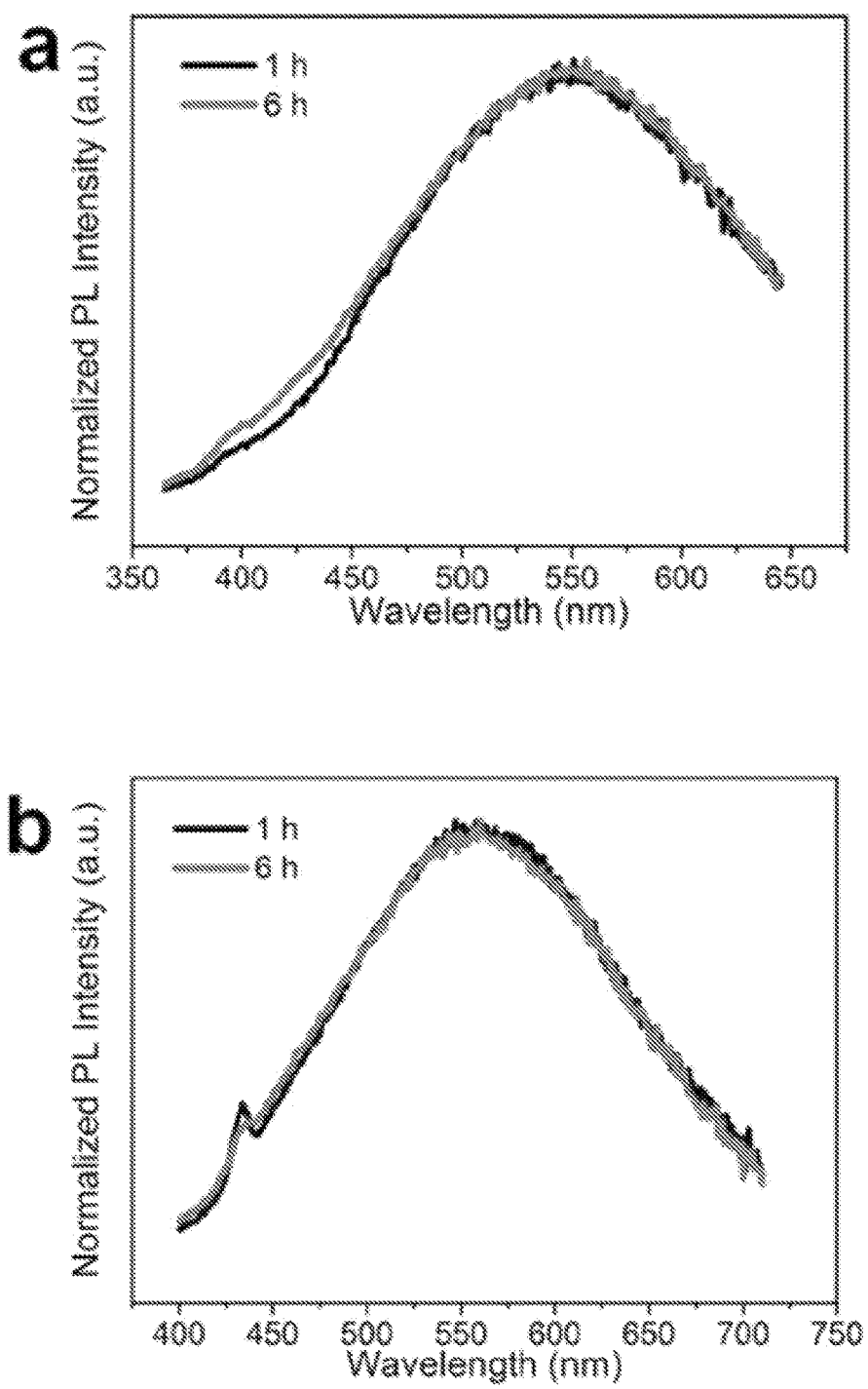
FIG. 18 shows the emission spectra of GQDs synthesized at 130° C. for 1 hour and 6 hours. The spectra were excited at 325 nm (FIG. 18A) and 365 nm (FIG. 18B).
Figure 19:
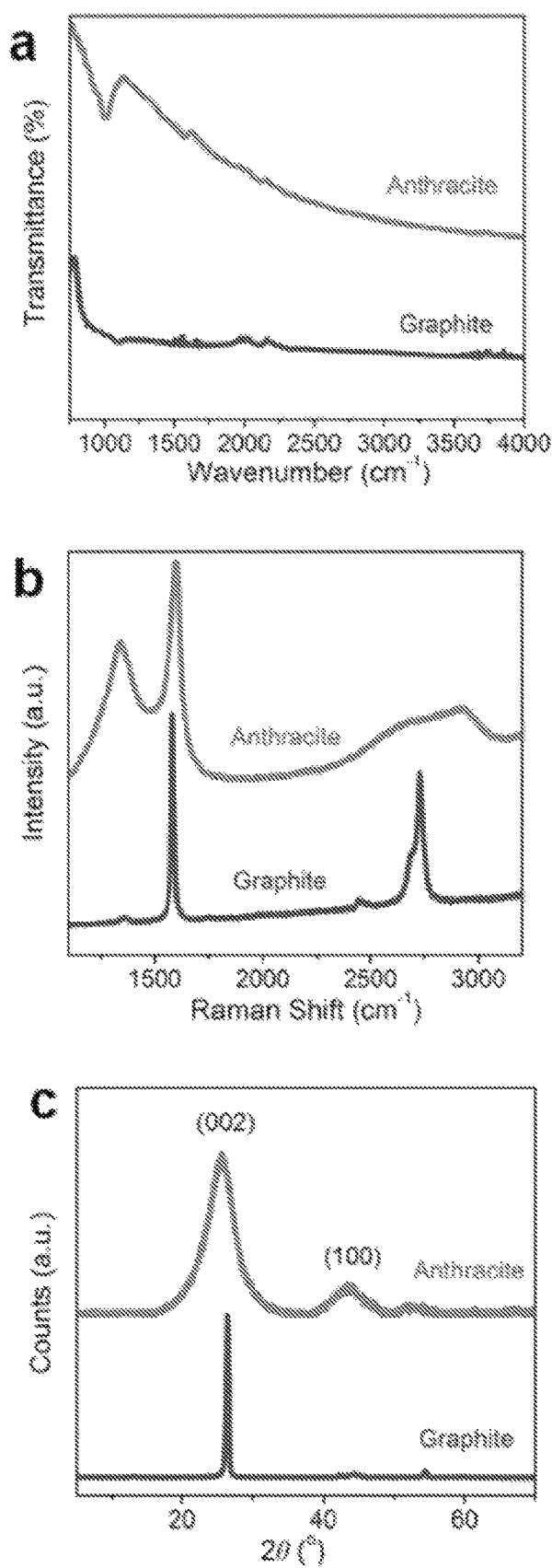
FIG. 19 provides FTIR (FIG. 19A), Raman (FIG. 19B), and XRD (FIG. 19C) spectra of anthracite and graphite. In the Raman spectrum, the larger D peak at 1350 $cm^{-1}$ of anthracite indicates a higher defect. In the XRD spectrum, the d-spacing for anthracite and graphite was 0.346 nm and 0.337 nm, respectively. The broader peak at ~26° for anthracite indicates a smaller crystalline domain.

The effect of reaction time on tuning the bandgap of GQDs was also evaluated by studying the properties of GQDs synthesized at 130° C. with different reaction times. As shown in FIG. 18, the peak emissions of GQDs reacted for 1 hour and 6 hours show no apparent shift, indicating that the reaction time does not appreciably affect the emission maximum. Instead, the temperature is the determinant factor in tailoring the bandgap of GQDs. Furthermore, the facile control of the coal-derived GQD bandgaps is attributed to the intrinsically smaller 2-D crystalline domain sizes within the coal when compared to the domain sizes in graphite (FIG. 19) along with the product defects.

In summary, Applicants have developed two approaches to obtain GQDs with controlled bandgaps. One is using cross-flow ultrafiltration to separate GQDs by size, and the other is by directly controlling the reaction temperature, which affects the final GQD size. These GQDs display photoluminescence, depending on size and functionalities, from green to orange-red. The tunable emission and fluorescent quantum yield indicates that the photoluminescence of GQDs derived from coal comes from the intrinsic state emission and defect state emission.

EXAMPLE 1.1

Materials

Anthracite (Fisher Scientific, catalogue number S98806), bituminous coal (Fisher Scientific, catalogue number S98809), graphite (Sigma-Aldrich, catalogue number 332461, B150mm flakes), $H_2SO_4$ (95-98%, Sigma-Aldrich), and $HNO_3$ (70%, Sigma-Aldrich) were used as received unless noted otherwise. Polytetrafluoroethylene membranes (Sartorius, lot number 11806-47-N) and dialysis bags (Membrane Filtration Products, Inc. Product number 1-0150-45) were used to purify the GQDs. The cross-flow ultrafiltration instrument was a Spectrum Labs Krosflo, Research IIi TFF System. The ultra-filtration membranes were hollow membranes made of modified polyethersulfone. The ultra-filtration membranes were also purchased from Spectrum Lab (Product number D02-Exxx-05-S).

EXAMPLE 1.2

Preparation of GQDs for Cross-flow Ultrafiltration

In a typical procedure, 6 g of anthracite was dispersed in a mixed solvent of 225 mL sulfuric acid and 75 mL nitric acid. The solution was sonicated (Cole Parmer, model 08849-00) for 2 hours and then heated at 100° C. for 1 day. After the thermal oxidation, a clear brown-red solution resulted. The solution was then cooled in an ice-water bath and diluted three times with deionized (DI) water. After that, the solution was dialyzed in 1000 Dalton dialysis bag against DI water for 3 days.

EXAMPLE 1.3

Separation of GQDs by Cross-flow Ultrafiltration

As illustrated in FIG. 2B, the as-prepared GQDs are separated using cross-flow ultrafiltration. Ultra-filtration occurs sequentially through three different membranes with pore sizes of 3 kilo Dalton (kD), 10 Kd and 30 kD, respectively. The transmembrane pressure (TMP) of the membranes was at ~1 atm. The flow rate was kept constant throughout the experiment at about ~50-100 mL/minute.

As the pore size and TMP increased, the permeability of GQDs increased. Thus, by exploiting appropriate membrane size and TMP values, GQDs with different size distributions were obtained. The membrane was changed when the permeate turned from brown to colorless. Each separation batch took 1 to 2 hours.

EXAMPLE 1.4

Preparation of GQDs at Varying Temperatures

In a typical procedure, 3 g of anthracite was dispersed in a mixed solvent of 225 mL sulfuric acid and 75 mL nitric acid. The solution was sonicated (Cole Parmer, model 08849-00) for 2 hours and then heated at different temperatures (50 to 150° C.) for 1 day. After the thermal oxidation, a clear brown-red solution resulted. The solution was then cooled in an ice-water bath and diluted three times with DI water. After that, the solution was dialyzed in a 1000 Dalton dialysis bag against DI water for 3 days.

EXAMPLE 1.5

Improving the Quantum Yield by NaOH Treatment

In a typical procedure, a 15 mL solution containing 1 mg/mL GQDs in 0.2 M aqueous NaOH was prepared, transferred to a sealed Teflon autoclave, and heated to 180° C. for 1 day. After cooling to room temperature, the solution was transferred to a 1000 Dalton dialysis bag and dialyzed against DI water for 3 days.

EXAMPLE 1.6

Improving the Quantum Yield by $Na_2S$ Treatment

In a typical procedure, a 15 mL aqueous solution containing 1 mg/mL GQDs in 1 M $Na_2S$ was prepared in a round-bottom flask. The solution was heated to 100° C. under nitrogen for 1 day. After cooling to room temperature, the solution was transferred to a 1000 Dalton dialysis bag and was dialyzed against DI water for 3 days.

EXAMPLE 1.7

Sample Characterization

Transmission electron microscopy (TEM) images were taken using a 2100 F field emission gun TEM with GQDs directly transferred onto a C-flat TEM grid. Dynamic light scattering was performed on a Malvern Zen 3600 Zetasizer with refractive index of 2 at 25° C. X-ray photoelectron spectroscopy (XPS) spectra were measured on a PHI Quantera SXM scanning X-ray microprobe with a 45° take-off angle and 100 µm beam size. The pass energy for surveys was 140 and 26 eV for high-resolution scans. A 2 nm Au layer was sputtered (Denton Desk V Sputter system) on the sample surface before scanning. Raman microscopy was performed with a Renishaw Raman microscope using 514 nm laser excitation at room temperature. Mass spectrometry was conducted on a Bruker Autoflex MALDI ToF instrument. Ultraviolet-visible (UV) spectra were recorded on a Shimadzu UV-2450 ultraviolet-visible spectrophotometer. Steady-state spectra were obtained in a HORIBA JovinYvon Fluorolog 3. Solid state FTIR spectra were obtained on a Nicolet FTIR Microscope with an MCT/B detector. $^{13}C$ Nuclear magnetic resonance (NMR) was performed on a Bruker Avance III 4.7 T spectrometer (50.3 MHz $^{13}C$, 200.1 MHz $^{1}H$) with a standard broadband MAS probe designed for 4 mm rotors. Direct $^{13}C$ pulse spectra were obtained with 12 kHz MAS, a 90° pulse, 20.5 ms FID, 10 s relaxation delay, and differing number of scans (1440 for GQDs-S4.5, 1600 for GQDs-S16, 3400 for GQDs-S41, 3280 for GQDs-S70, 9024 for GQDs-T150-7.6, 16928 for GQDs-T130-25, 8096 for GQDs-T110-27 and 6328 for GQDs-T50-54), with each FID processed with 50 Hz (1 ppm) of line broadening. $^{1}H$-$^{13}C$ CP spectra were obtained with 7.6 kHz MAS, a 1 ms contact time, 32.8 ms FID, 5 s relaxation delay, and differing number of scans (10600 for each of GQDs-S4.5, GQDs-S41, GQDs-S70 and 10400 for GQDs-S16, 30632 for GQDs-T150-7.6, 32600 for GQDs-T130-25, 14000 for GQDs-T110-27, and 17000 for GQDs-T50-54), with each FID processed with 50 Hz of line broadening. More scans were taken for GQDs-T150-7.6 and GQDs-T130-25 to compensate for the limited amount of sample available.

EXAMPLE 1.8

Equation for Transmembrane Pressure

The equation used to calculate transmembrane pressure was as follows:

$$TMP = \frac{P_F + P_R}{2} - P_P$$

In the above equation, $P_F$, $P_R$, and $P_P$ are the pressure at feed, retentate and permeate, respectively. The TMP value used in the cross-flow filtration was kept constant at ~1 atm.

EXAMPLE 1.9

Quantum Yield Calculation

The equation used to calculate quantum yield was as follows:

$$\Phi_i = \Phi_r \frac{I_g(1-10^{-A_r})n_i^2}{I_r(1-10^{-A_i})n_r^2}$$

In the above equation, $\Phi_i$ and $\Phi_r$ are the quantum yield of samples and reference, respectively. The integrated intensities (area) of sample and reference are $I_i$ and $I_r$, respectively. $A_i$ and $A_r$ are the absorbance, $n_i$ and $n_r$ are the refractive indices of the samples and reference solution, respectively.

EXAMPLE 1.10

XRD D-spacing Calculation

The equation used to calculate the XRD d-spacing was as follows:

$$2d\sin(\theta) = n\lambda$$

In the above equation, d is the d-spacing, θ is the XRD peak, and λ is the X-ray wavelength (Copper source, λ=0.154059 nm). This equation can be used to calculate the d-spacing of the (002) crystalline structure of anthracite and graphite.

EXAMPLE 1.11

Calculation of Hydrodynamic Diameters

Figure 3:
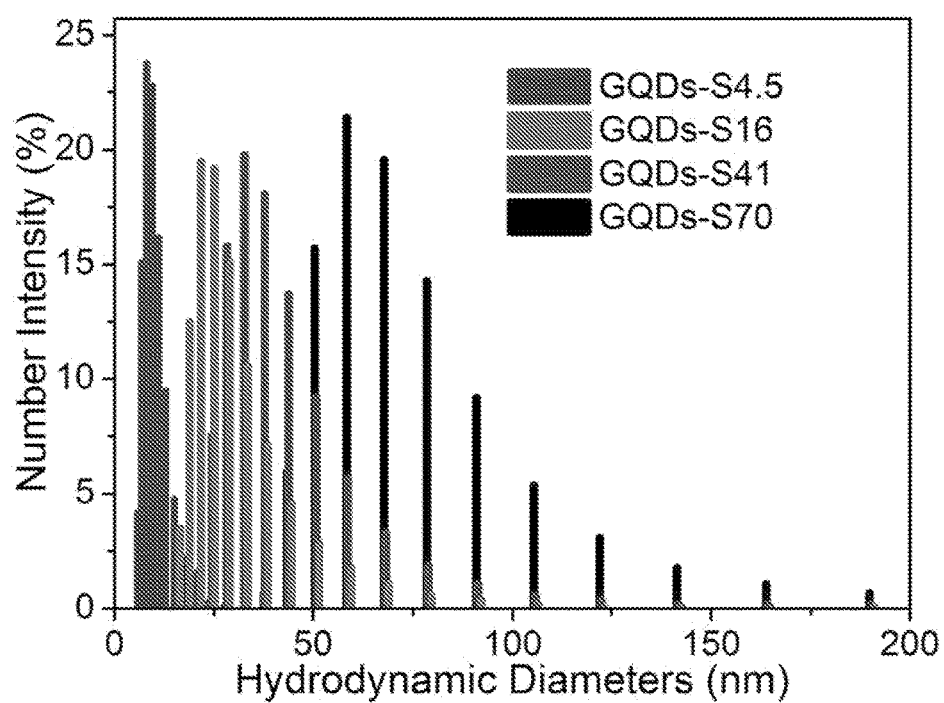
FIG. 3 provides the hydrodynamic diameters of GQDs at different sizes obtained from dynamic light scattering (DLS). The legend sizes are listed so as to be consistent with the TEM legend in FIG. 2G. However, the actual DLS recorded average sizes are 10±2.5, 27±7.9, 41±11 and 76±18 nm, respectively.

The following formulas were utilized to calculate the hydrodynamic diameters illustrated in FIG. 3:

$$y = y_o + \frac{1}{x\sqrt{2\pi}\,\sigma} e^{-\frac{(lnx-\mu)^2}{2\sigma^2}}$$

$$\text{Mean} = e^{\mu+\sigma^2/2}$$

$$\text{Standard Deviation} = \sqrt{e^{\sigma^2}-1}\, e^{\mu+\sigma^2/2}.$$

EXAMPLE 2

Alternative Methods of Making Graphene Quantum Dots

This example provides additional methods by which graphene quantum dots could be synthesized. This includes the use of nitric acid only. It also includes the use of removal of the nitric acid by evaporation after the reaction is complete. It also includes the extraction of the GQDs from the acid solution using ethyl acetate or ethyl acetate/2-butanol mixtures, and then evaporation of the organic solvents.

EXAMPLE 2.1

Procedure for GQD Synthesis from Anthracite in Mixed Acid 2.5 g of anthracite coal was suspended in concentrated sulfuric acid (60 mL) and nitric acid (40 mL). The reaction was then stirred and heated at 100° C. for 15 hours. The solution was cooled to room temperature and slowly poured into a beaker containing 200 mL of cold water. The reaction mixture was then filtered through a sinter to remove a black solid. Next, 150 mL of filtrate was extracted with 150 mL of 2-butanol/ethyl acetate (v/v, 60/40). The organic layer was dried by $MgSO_4$ and filtered through a sinter. The solution was concentrated using rotary evaporation to obtain solid GQDs. Finally, the GQD solid was dried at 60° C. in a vacuum oven for 15 hours. The GQD solid (21% yield) was partially soluble in water. Size selection can be conducted as described previously by crossflow filtration.

EXAMPLE 2.2

Procedure for GQD Synthesis from Anthracite in Nitric Acid 5 g of anthracite coal was added to a round bottom flask equipped with a stir bar and mixed with 90 mL of 70% $HNO_3$. The dispersed coal was heated to reflux while stirring for 17 hours and allowed to cool to room temperature. The solution was filtered through a sinter and the $HNO_3$ was removed using rotary evaporation. A dry red-brown powder of graphene quantum dots was obtained in 44% yield. Size selection can be conducted as described previously by crossflow filtration.

EXAMPLE 2.3

Procedure for GQD Synthesis from Bituminous in Nitric Acid

Concentrated nitric acid (100 mL) was added to bituminous coal (4.0 g). The suspension was then heated at reflux for 18 hours. Upon cooling to room temperature, a 3 mL aliquot was diluted twofold with deionized water and extracted with ethyl acetate (five 4 mL portions). The organic layer was dried with sodium sulfate and concentrated under reduced pressure. The concentrated solution was then added to hexanes to precipitate an orange solid, which was further dried under vacuum for 24 hours to obtain 50 mg of product (or an extrapolated 38% yield). Alternatively, the concentrated solution can be dried by heating to 60° C. under vacuum (0.1 mm Hg) to yield 42% solid product. Size selection can be conducted as described previously by crossflow filtration.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A scalable method for producing carbon quantum dots with desired bandgaps, said method comprising:

exposing a carbon source to an oxidant at a reaction temperature,
  wherein the carbon source is selected from the group consisting of coal, coke, and combinations thereof, and
  wherein the exposing results in formation of the carbon quantum dots from the carbon source; and
selecting a desired size of the formed carbon quantum dots, wherein the selecting includes at least one of:
  separating the desired size of the formed carbon quantum dots from other formed carbon quantum dots;
  selecting the reaction temperature that produces the desired size of the formed carbon quantum dots; and
  combinations thereof.

2. The method of claim 1, wherein the exposing comprises sonicating the carbon source in presence of the oxidant.

3. The method of claim 1, wherein the exposing comprises heating the carbon source in presence of the oxidant at the reaction temperature.

4. The method of claim 3, wherein the reaction temperature is at least about 100° C.

5. The method of claim 3, wherein the reaction temperature ranges from about 100° C. to about 150° C.

6. The method of claim 1, wherein the carbon source comprises coal.

7. The method of claim 6, wherein the coal is selected from the group consisting of anthracite, bituminous coal, sub-bituminous coal, metamorphically altered bituminous coal, asphaltenes, asphalt, peat, lignite, steam coal, petrified oil, and combinations thereof.

8. The method of claim 1, wherein the carbon source comprises anthracite.

9. The method of claim 1, wherein the carbon source comprises bituminous coal.

10. The method of claim 1, wherein the oxidant comprises an acid.

11. The method of claim 10, wherein the acid is selected from the group consisting of sulfuric acid, nitric acid, phosphoric acid, hypophosphorous acid, fuming sulfuric acid, hydrochloric acid, oleum, chlorosulfonic acid, and combinations thereof.

12. The method of claim 1, wherein the oxidant is a mixture of sulfuric acid and nitric acid.

13. The method of claim 1, wherein the oxidant comprises nitric acid.

14. The method of claim 1, further comprising a step of purifying the formed carbon quantum dots.

15. The method of claim 14, wherein the purifying occurs prior to a step of selecting the desired size of the formed carbon quantum dots.

16. The method of claim 14, wherein the purifying is selected from the group consisting of extraction, filtration, evaporation, precipitation, dialysis, and combinations thereof.

17. The method of claim 14, wherein the purifying comprises extracting the formed carbon quantum dots from a reaction mixture.

18. The method of claim 14, wherein the purifying comprises:
  neutralizing a solution comprising the formed carbon quantum dots,
  filtering the solution, and
  dialyzing the solution.

19. The method of claim 1, further comprising a step of enhancing a quantum yield of the carbon quantum dots.

20. The method of claim 19, wherein the enhancing occurs by hydrothermal treatment of the carbon quantum dots, treatment of the carbon quantum dots with one or more bases, treatment of the carbon quantum dots with one or more hydroxides, treatment of the carbon quantum dots with one or more dopants, treatment of the carbon quantum dots with one or more reducing agents, and combinations thereof.

21. The method of claim 19, wherein the enhancing occurs by hydrothermal treatment of the carbon quantum dots.

22. The method of claim 19, wherein the enhancing occurs by treatment of the carbon quantum dots with one or more reducing agents.

23. The method of claim 22, wherein the reducing agent is selected from the group consisting of hydrazine, sodium borohydride, heat, light, sulfur, sodium sulfide, sodium hydrogen sulfide, and combinations thereof.

24. The method of claim 1, wherein the selecting comprises selecting the reaction temperature that produces the desired size of the formed carbon quantum dots.

25. The method of claim 24, wherein the selected reaction temperature is a set temperature that remains constant during the exposing step.

26. The method of claim 24, wherein the selected reaction temperature ranges from about 25° C. to about 200° C.

27. The method of claim 24, wherein the selected reaction temperature ranges from about 50° C. to about 150° C.

28. The method of claim 24, wherein the selected reaction temperature ranges from about 100° C. to about 150° C.

29. The method of claim 24, wherein the desired size of the carbon quantum dots decreases as the selected reaction temperature increases.

30. The method of claim 1, wherein the selecting comprises separating the desired size of the formed carbon quantum dots from other formed carbon quantum dots.

31. The method of claim 30, wherein the separating comprises filtration.

32. The method of claim 31, wherein the filtration is selected from the group consisting of macrofiltration, microfiltration, ultrafiltration, cross-flow filtration, cross-flow ultrafiltration, membrane filtration, dialysis, and combinations thereof.

33. The method of claim 31, wherein the filtration occurs through a porous membrane.

34. The method of claim 33, wherein the porous membrane comprises pore sizes that range from about 1 kD to about 100 kD.

35. The method of claim 31, wherein the filtration occurs sequentially through multiple porous membranes.

36. The method of claim 35, wherein the porous membranes have different pore sizes.

37. The method of claim 1, wherein the desired size of carbon quantum dots includes a size range.

38. The method of claim 1, wherein the desired size of the carbon quantum dots ranges from about 1 nm in diameter to about 200 nm in diameter.

39. The method of claim 1, wherein the desired size of the carbon quantum dots ranges from about 1 nm in diameter to about 100 nm in diameter.

40. The method of claim 1, wherein the desired size of the carbon quantum dots ranges from about 2 nm in diameter to about 80 nm in diameter.

41. The method of claim 1, wherein the carbon quantum dots comprise graphene quantum dots.

42. The method of claim 1, wherein the carbon quantum dots are functionalized with a plurality of functional groups.

43. The method of claim 42, wherein the functional groups are selected from the group consisting of amorphous carbon, oxygen groups, carbonyl groups, carboxyl groups, aromatic groups, alkane groups, alkene groups, ketone groups, esters, amines, amides, and combinations thereof.

44. The method of claim 1, wherein the carbon quantum dots are edge functionalized with a plurality of functional groups.

45. The method of claim 1, wherein the carbon quantum dots have a single layer.

46. The method of claim 1, wherein the carbon quantum dots have a plurality of layers.

47. The method of claim 46, wherein the carbon quantum dots have from about two layers to about four layers.

48. The method of claim 1, wherein the carbon quantum dots have a crystalline hexagonal structure.

49. The method of claim 1, wherein the carbon quantum dots are photoluminescent.

50. The method of claim 1, wherein the carbon quantum dots have bandgaps that range from about 0.5 eV to about 3 eV.

51. The method of claim 1, wherein the carbon quantum dots have bandgaps that range from about 2 eV to about 3 eV.

52. The method of claim 1, wherein the method forms carbon quantum dots in bulk quantities.

53. The method of claim 52, wherein the bulk quantities are more than about 1 kg of carbon quantum dots.

54. The method of claim 52, wherein the bulk quantities range from about 1 g of carbon quantum dots to about 10 tons of carbon quantum dots.

\* \* \* \* \*